(12) United States Patent
Yamashita et al.

(10) Patent No.: US 7,220,038 B2
(45) Date of Patent: *May 22, 2007

(54) LIGHT SOURCE DEVICE AND LIGHT POLARIZING ELEMENT

(75) Inventors: Tomoyoshi Yamashita, Kanagawa (JP); Issei Chiba, Kanagawa (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 70 days.

This patent is subject to a terminal disclaimer.

(21) Appl. No.: 10/519,076

(22) PCT Filed: Jun. 24, 2003

(86) PCT No.: PCT/JP03/07965

§ 371 (c)(1),
(2), (4) Date: Dec. 23, 2004

(87) PCT Pub. No.: WO2004/019082

PCT Pub. Date: Mar. 4, 2004

(65) Prior Publication Data

US 2005/0254259 A1 Nov. 17, 2005

(30) Foreign Application Priority Data

Jun. 24, 2002 (JP) .............................. 2002-183233

(51) Int. Cl.
*F21V 7/04* (2006.01)

(52) U.S. Cl. ...................... 362/606; 362/626; 362/615; 362/620; 362/339; 362/330

(58) Field of Classification Search ................ 362/606, 362/607, 620, 615, 614, 626, 617
See application file for complete search history.

(56) References Cited

U.S. PATENT DOCUMENTS

| | | | | |
|---|---|---|---|---|
| 5,668,913 | A * | 9/1997 | Tai et al. ...................... | 385/146 |
| 6,011,602 | A * | 1/2000 | Miyashita et al. ............ | 349/65 |
| 6,502,947 | B2 * | 1/2003 | Matsumoto et al. ........ | 362/626 |
| 6,648,485 | B1 * | 11/2003 | Colgan et al. .............. | 362/600 |

FOREIGN PATENT DOCUMENTS

EP     0 292 159 A1    11/1988

(Continued)

*Primary Examiner*—Sandra O'Shea
*Assistant Examiner*—Zahra I. Bennett
(74) *Attorney, Agent, or Firm*—Morgan, Lewis & Bockius

(57) ABSTRACT

A light source device, comprising a light guide (3) having two light incident surfaces opposed to each other for receiving incident light radiated from a primary light source and a light outgoing surface (33) for emitting the incident light and a light deflection element (4) disposed adjacent to the light emitting surface side of the light guide, the light deflection element (4) further comprising a light receiving surface (41) for receiving incident light and a light emitting surface (42) positioned on the opposite side thereof and emitting the incident light, wherein a plurality of elongated prisms formed of two prism faces are disposed on the light receiving surface (41) generally parallel with each other, the prism surfaces are formed of at least two faces (46, 47, 48, 49, 50, 51) with different inclination angles, and the inclination angles are larger for the faces positioned nearer the light emitting surface (42).

40 Claims, 8 Drawing Sheets

FOREIGN PATENT DOCUMENTS

| | | |
|---|---|---|
| JP | 63-298902 A | 6/1988 |
| JP | 7-008804 U | 1/1995 |
| JP | 7-230002 A | 8/1995 |
| JP | 8-304607 A | 11/1996 |
| JP | 9-105804 A | 4/1997 |
| JP | 9-507584 A | 7/1997 |
| JP | 11-038209 A | 2/1999 |
| JP | 11-271765 A | 10/1999 |
| JP | 2000-035763 A | 2/2000 |
| JP | 2000-158450 A | 6/2000 |
| JP | 2001-124909 A | 5/2001 |
| JP | 2001-143515 | 5/2001 |
| JP | 2003-066206 A | 3/2003 |

* cited by examiner

LIGHT SOURCE DEVICE AND LIGHT POLARIZING ELEMENT

TECHNICAL FIELD

The present invention relates to an edge-light type light source device constituting a liquid crystal display device or the like that is used as a display portion of a notebook personal computer, a liquid crystal television, a portable telephone, a portable information terminal, or the like and to a light deflection element for use in the light source device and, in particular, relates to a light source device that is suitably used in a liquid crystal display device or the like with a relatively large size, has primary light sources disposed facing two opposite side end surfaces of a light guide, respectively, and can achieve an extremely high luminance without causing a large reduction in luminance due to a change in viewing direction, and to a light deflecting element for use in such a light source device.

BACKGROUND ART

In recent years, color liquid crystal display devices have been widely used in various fields as monitors of portable notebook personal computers, persons computers, and so forth, or as display portions of liquid crystal televisions, video-combined liquid crystal televisions, portable telephones, portable information terminals or personal digital assistants, and so forth. Further, following increase in information processing amount, diversification of needs, multimedia adaptation, and so forth, increase in screen size and fineness in display of the liquid crystal display devices has been actively developed.

The liquid crystal display device basically comprises a backlight portion and a liquid crystal display element portion. As the backlight portion, there is an under-light type wherein a light source is disposed directly under the liquid crystal display element portion, or an edge-light type wherein a primary light source is disposed facing a side end surface of a light guide. In terms of making the liquid crystal display device compact, the edge-light type has often been used.

In recent years, in the liquid crystal display device or the like, use has been made of, in terms of reducing power consumption, one, as a backlight portion of the edge-light type, that reduces a spread angle of light emitted from a display screen as such as possible to emit light concentratedly in a required angle range for effectively utilizing the quantity of light emitted from a primary light source.

In the display device wherein the viewing direction range is limited as described above, as a light source device that emits light concentratedly in a relatively narrow range for increasing the utilization efficiency of the quantity of light of a primary light source to thereby reduce the power consumption, the present applicant has proposed in JP (A)-2001-143515 to use a prism sheet having prism-formed surfaces on both sides thereof so as to dispose it adjacent to a light outgoing surface of a light guide. In this double-sided prism sheet, a light receiving surface being one surface and a light emitting surface being the other surface are respectively formed with a plurality of mutually parallel elongated prisms, wherein the directions of the elongated prisms are matched with each other on the light receiving surface and the light emitting surface and further the elongated prisms are disposed at corresponding positions on both surfaces. With this configuration, light having a peak of outgoing light in a direction inclined relative to the light outgoing surface of the light guide and exiting from the light outgoing surface so as to be distributed in a proper angle range is incident on one-side prism faces of the elongated prisms at the light receiving surface of the prism sheet, then is internally reflected by the other-side prism faces, and is further subjected to a refraction action by the elongated prisms at the light emitting surface, so that the light is emitted concentratedly in a required relatively narrow direction.

However, such a light source device has a problem that although the concentrated emission in the narrow angle range is enabled, an outgoing light distribution is extremely narrow so that a large reduction in luminance is caused only by a small change in viewing direction, thereby being inferior in practicality in case of a light source device with a relatively large size. Further, according to such a light source device, in the prism sheet used as a light deflection element, the plurality of mutually parallel elongated prisms are required such that the directions of the elongated prisms are matched with each other on the light receiving surface and the light emitting surface, and further, the elongated prisms are disposed at the corresponding positions on both surfaces. This formation is complicated.

On the other hand, for the purpose of enhancing a light condensing property and light directivity when deflecting light emitted from a light guide by the use of a prism sheet, JP(A)-9-507584, JP(A)-9-105804, JP(A)-11-38209, and JP(A)-2000-35763 have proposed that a prism face, located on the side farther from a light source, of each of elongated prisms forming the prism sheet be formed into a convex curved surface shape. However, since the convex curved surface shaped prism faces described in those publications each have a radius of curvature that is relatively larger or relatively smaller, a distribution of the outgoing light from the light guide cannot be sufficiently narrowed or is extremely narrowed or, according to circumstances, is conversely broadened. Further, in any of the light guides described in those publications, a light emitting function structure thereof cannot achieve a high directivity so that light of which an outgoing light distribution is relatively broad is emitted, and therefore, it is not possible to sufficiently improve the luminance even by condensing the light using the prism sheet.

Further, JP(A)-63-298902 discloses a prism sheet having a light receiving surface formed with elongated prisms each having a pentagonal shape in section. A face on the side of a prism vertex portion and a face on the side near a light emitting surface, which constitute each of two prism faces of each elongated prism, form a large angle therebetween, and therefore, this prism sheet cannot sufficiently narrow a distribution of outgoing light from a light guide so that its light condensing property is low and thus a luminance improving effect thereby is small.

DISCLOSURE OF THE INVENTION

It is therefore an object of the present invention to provide a light source device that can achieve improvement in luminance by a high light-condensing effect, that is small in reduction of luminance with respect to a change in viewing direction, that enables improvement in utilization efficiency of the quantity of light emitted from a primary light source (i.e. increases efficiency of emitting light, which is emitted from a primary light source, concentratedly in a required viewing direction), and further, that can easily improve the image quality with a simplified structure.

A light source device of the present invention is characterized by comprising primary light sources, a light guide having two light incident surfaces opposed to each other and adapted to receive light emitted from said primary light sources, and a light outgoing surface for guiding and emitting the received light, and a light deflection element disposed adjacent to the light guide on a light outgoing surface side thereof, wherein the light deflection element has a light receiving surface for receiving the light and a light emitting surface located on a side opposite to the light receiving surface for emitting the received light, the light receiving surface has a plurality of elongated prisms arrayed substantially parallel to each other and each composed of two prism faces, and each of the prism faces is formed by at least two faces having different inclination angles wherein one of the faces located closer to the light emitting surface has a larger inclination angle and a difference between an inclination angle of one of the faces closest to the light emitting surface and an inclination angle of the other one of the faces farthest from the light emitting surface is 15 degrees or less.

In an aspect of the present invention, at least one of the faces is a flat face. In an aspect of the present invention, all of the faces are flat faces. In an aspect of the present invention, the faces are at least three flat faces.

In an aspect of the present invention, at least one of the faces is a convex curved face. In an aspect of the present invention, all of the faces are convex curved faces. In an aspect of the present invention, the faces are at least one flat face and at least one convex curved face. In an aspect of the present invention, the faces are at least two flat faces and at least one convex curved face. In an aspect of the present invention, at least two of the faces are convex curved faces having mutually different shapes.

A light deflection element of the present invention is characterized by comprising a light receiving surface for receiving light and a light emitting surface located on a side opposite to said light receiving surface for emitting the received light, wherein the light receiving surface has a plurality of elongated prisms arrayed substantially parallel to each other and each composed of two prism faces, and each of the prism faces is fanned by at least two faces having different inclination angles wherein one of the faces located closer to the light emitting surface has a larger inclination angle and a difference between an inclination angle of one of the faces closest to the light emitting surface and an inclination angle of the other one of the faces farthest from the light emitting surface is 15 degrees or less.

In an aspect of the present invention, at least one of the faces is a flat face. In an aspect of the present invention, all of the faces are flat faces. In an aspect of the present invention, the faces are at least three flat faces.

In an aspect of the present invention, at least one of the faces is a convex curved face. In an aspect of the present invention, all of the faces are convex curved faces. In an aspect of the present invention, the faces are at least one flat face and at least one convex curved face. In an aspect of the present invention, the faces are at least two flat faces and at least one convex curved face. In an aspect of the present invention, at least two of the faces are convex curved faces having mutually different shapes.

According to the present invention, both prism faces of each of elongated prisms formed at a light receiving surface of a light deflection element are each formed by faces such as a plurality of flat faces, convex curved faces, or the like having different inclination angles so that it is possible to provide a light source device that can achieve improvement in luminance by a high light-condensing effect, that is small in reduction of luminance with respect to a change in viewing direction, that enables improvement in utilization efficiency of the quantity of light emitted from a primary light source (i.e. increases efficiency of emitting light, which is emitted from a primary light source, concentratedly in a required viewing direction), and further, that can easily improve the image quality with a simplified structure.

BEST MODE FOR CARRYING OUT THE INVENTION

Hereinbelow, an embodiment of the present invention will be described with reference to the drawings.

Figure 1:
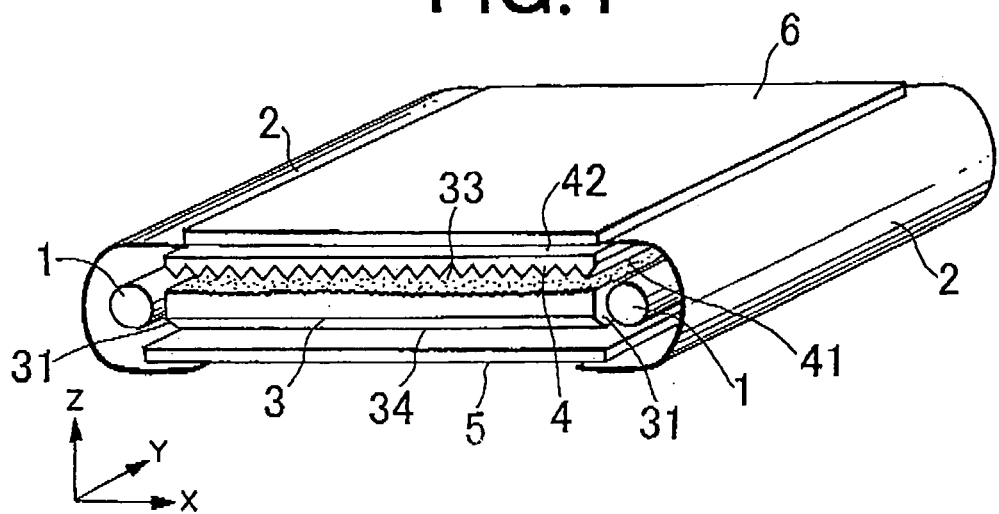
FIG. 1 is a schematic perspective view showing a light source device according to the present invention.

FIG. 1 is a schematic perspective view showing one embodiment of a surface light source device according to the present invention. As illustrated in FIG. 1, the surface light source device of the present invention comprises a light guide 3 in which two side end surfaces opposed to each other (i.e. located on the opposite sides) serve as light incident surfaces 31 and one surface (principal surface) substantially perpendicular thereto serves as a light outgoing surface 33, primary light sources 1 disposed facing the light incident surfaces 31 of the light guide 3 and covered with light source reflectors 2, respectively, a light deflection element 4 disposed on the light outgoing surface of the light guide 3, and a light reflection element 5 disposed at a hack surface 34 of the light guide 3 on its side opposite to the light outgoing surface 33.

The light guide 3 is disposed parallel to the XY-plane and forms a rectangular plate shape on the whole. The light guide 3 has four side end surfaces of which a pair of side end surfaces parallel to the YZ-plane are used as the light incident surfaces 31. Each light incident surface 31 is disposed facing the primary light source 1 so that light emitted from the primary light source 1 enters the light guide 3 through the light incident surface 31.

The two principal surfaces of the light guide 3 that are substantially perpendicular to the light incident surfaces 31 are located substantially parallel to the XY surface, respectively, and either one surface (upper surface in the figure) is used as the light outgoing surface 33. A directive light emitting function portion in the form of a roughened surface, a directive light emitting function portion in the form of a lens surface on which a number of elongated lenses such as elongated prisms, elongated lenticular lenses, V-shaped grooves, or the like are formed substantially parallel to the light incident surfaces 31, or the like is given to at least one of the light outgoing surface 33 and the back surface 34, so that light entering from each light incident surface 31 is guided in the light guide 3 and emitted from the light outgoing surface 33 as light having a directivity in an outgoing light intensity distribution in the plane (XZ-plane) that is perpendicular to the light incident surfaces 31 and the light outgoing surface 33. Given that an angle formed between a direction of a peak of the outgoing light intensity distribution in the XZ-plane and the light outgoing surface 33 is set to a, this angle a is preferably set to 10 to 40 degrees and the full width half maximum of the outgoing light intensity distribution is preferably set to 10 to 50 degrees.

It is preferable in terms of improving the uniformity of luminance in the light outgoing surface 33 that the roughened surface or the elongated lenses formed on the surface of the light guide 3 be so set that an average inclination angle θa pursuant to ISO4287/1-1984 falls within the range of 0.5 to 15 degrees. The average inclination angle θa more preferably falls within the range of 1 to 12 degrees, and further preferably 1.5 to 11 degrees. It is preferable that the average inclination angle θa be set in the optimum range according to a ratio (L/t) between a thickness (t) of the light guide 3 and a length (L) thereof in a direction of propagation of the incident light. That is, when use is made of the light guide 3 having L/t of about 20 to 200, the average inclination angle θa is preferably set to 0.5 to 7.5 degrees, more preferably 1 to 5 degrees, and further preferably 1.5 to 4 degrees. On the other hand, when use is made of the light guide 3 having L/t of about 20 or less, the average inclination angle θa is preferably set to 7 to 12 degrees, and more preferably 8 to 11 degrees.

The average inclination angle θa of the roughened surface formed on the light guide 3 can be derived from the following equations (1) and (2) with an inclination function f(x) obtained by measuring a shape of the roughened surface using a contact-stylus type surface roughness meter and setting coordinates in a measurement direction as x, according to ISO4287/1-1984. Herein, L represents a measurement length and Δa represents a tangent of the average inclination angle θa.

$$\Delta a = (1/L) \int_0^L |(d/dx)f(x)| dx \quad (1)$$

$$\theta a = \tan^{-1}(\Delta a) \quad (2)$$

Further, the light guide 3 has a light emission ratio preferably in the range of 0.5 to 5%, and more preferably 1 to 3%. This is because when the light emission ratio becomes smaller than 0.5%, there is a tendency that the quantity of light exiting from the light guide 3 decreases so that a sufficient luminance cannot be obtained, while, when the light emission ratio becomes greater than 5%, there is a tendency that a large quantity of light exits in the vicinity of the primary light source 1 so that attenuation of the light becomes significant in the X-direction on the light outgoing surface 33 to thereby lower the uniformity of luminance at the light outgoing surface 33. By setting the light emission ratio of the light guide 3 to 0.5 to 5% as described above, it is possible to provide a light source device that can emit from the light guide 3 the light having an exiting characteristic of a high directivity such that the angle of the peak light (peak angle) in the outgoing light intensity distribution (in the XZ-plane) of the light exiting from the light outgoing surface falls within the range of 50 to 80 degrees relative to a normal of the light outgoing surface and the full width half maxim of the outgoing light intensity distribution (in the XZ-plane) is 10 to 50 degrees, that can efficiently deflect a direction of light from the light guide 3 by the light deflection element 4, and that can achieve a high luminance.

In the present invention, the light emission ratio of the light guide 3 is defined as follows. A relationship between a light intensity ($I_0$) of outgoing light at an edge of the light outgoing surface 33 on the side of the light incident surface 31 and a light intensity (I) of outgoing light at a position of a distance L from the edge of the light outgoing surface 33 on the side of the light incident surface 31 in case where only one of the primary light sources l is lit satisfies a relationship of the following equation (3) given that the thickness (dimension in Z-direction) of the light guide 3 is t.

$$I = I_0 \cdot \alpha (1-\alpha)^{L/t} \quad (3)$$

where a constant α represents the light emission ratio and is a ratio (%) of emission of light from the light guide 3 per a unit length (length corresponding to the light guide thickness t) on the light outgoing surface 33 in the X-direction perpendicular to the light incident surface 31. With the axis of ordinates representing logarithm of light intensity of outgoing light from the light outgoing surface 33 and the axis of abscissas representing (L/t), a relationship thereof is plotted so that the light emission ratio α can be derived from a gradient thereof.

Further, it is preferable that a lens surface arranged with a number of elongated lenses extending in the direction (X-direction) substantially perpendicular to the light incident surface 31 be formed at the other principal surface not given the directive light emitting function portion for controlling the directivity of the outgoing light from the light guide 3 in the plane (YZ-plane) parallel to the light incident surface 31. In the embodiment illustrated in FIG. 1, the light outgoing surface 33 is formed with a roughened surface, while the back surface 34 is formed with a lens surface composed of an array of a number of elongated lenses extending in the direction (X-direction) substantially perpendicular to the light incident surface 31. In the present invention, conversely to the made illustrated in FIG. 1, the light outgoing surface 33 may be formed with the lens surface while the back surface 34 may be formed into the roughened surface.

As shown in FIG. 1, when foaming the elongated lenses at the back surface 34 or the light outgoing surface 33 of the light guide 3, the elongated lenses may be elongated prisms, elongated lenticular lenses, V-shaped grooves, or the like extending substantially in the X-direction, while it is preferable that the elongated lenses be elongated prisms each having a substantially triangular shape in YZ-section.

In the present invention, when foaming the elongated prisms as the elongated lenses formed at the light guide 3, a vertical angle thereof is preferably set in the range of 70 to 150 degrees. This is because setting the vertical angle in this range makes it possible to sufficiently condense the outgoing light from the light guide 3 to thereby achieve sufficient improvement in luminance as the light source device. Specifically, setting the prism vertical angle in this range makes it possible to emit the condensed outgoing light in which the full width half of the outgoing light intensity distribution is 35 to 65 degrees in the plane (YZ-plane) including the peak light in the outgoing light intensity distribution (in the XZ-plane) and perpendicular to the XZ-plane, to thereby improve the luminance as the light source device. When forming the elongated prisms at the light outgoing surface 33, the vertical angle is preferably set in the range of 80 to 100 degrees, while, when forming the elongated prisms at the back surface 34, the vertical angle is preferably set in the range of 70 to 80 degrees or 100 to 150 degrees.

In the present invention, instead of forming the light emitting function portion at the light outgoing surface 33 or the back surface 34 as described above or in addition thereto, a directive light emitting function may be given by mixing and dispersing light diffusion particles inside the light guide. Further, as the light guide 3, ones having various sectional shapes such as a boat shape can be used without being limited to the sectional shape illustrated in FIG. 1.

Figure 2:
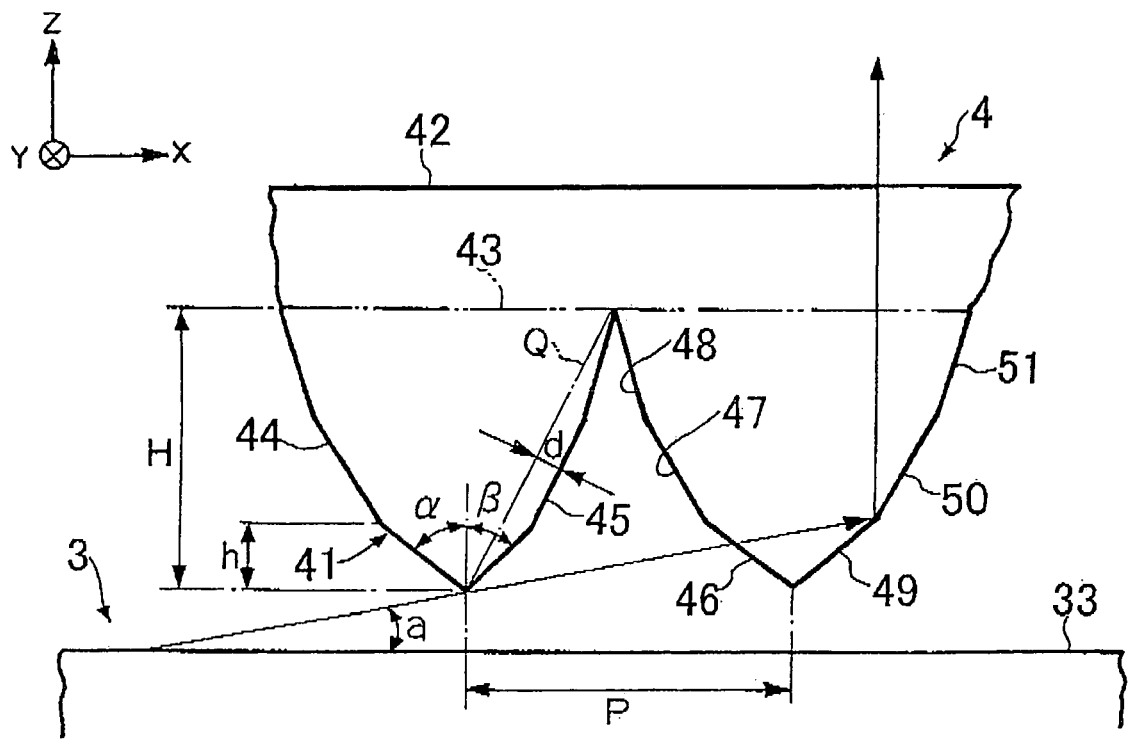
FIG. 2 is an explanatory diagram of the shape of each of elongated prisms at a light receiving surface of a light deflection element of the present invention.

FIG. 2 is an explanatory diagram of the shape of each of elongated prisms of the light deflection element 4. The light deflection element 4 uses one of its principal surfaces as a light receiving surface 41 and the other as a light emitting surface 42. The light receiving surface 41 has a number of elongated prisms arranged substantially parallel to each other, and each elongated prism is composed of two prism faces, i.e. a first prism face 44 located on the side of one of the primary light sources and a second prism face 45 located on the side farther from such a primary light source. In the embodiment illustrated in FIG. 2, the first prism face 44 and the second prism face 45 are each composed of three flat faces 46 to 48 or 49 to 51 having different inclination angles wherein the flat face closer to the light emitting surface has a larger inclination angle. Among the flat faces 46 to 51, a difference in inclination angle between the flat face 48 closest to the light emitting surface and the flat face 46 farthest from the light emitting surfaces which form the first prism face 44, is set to 15 degrees or less, and a difference in inclination angle between the flat face 51 closest to the light emitting surface and the flat face 49 farthest from the light emitting surface, which form the second prism face 45, is also set to 15 degrees or less. Note that, in the present invention, an inclination angle of a face such as a flat face represents an inclination angle of the face such as the flat face relative to a plane 43 on which elongated prisms are disposed.

In the light deflection element 4 of the present invention, the first prism face 44 and the second prism face 45 each comprise at least two faces such as flat faces, convex curved faces, or the like having different inclination angles wherein the face such as the flat face or the convex curved face closer to the light emitting surface has a larger inclination angle and the difference in inclination angle between the face such as the flat face or the convex curved face closest to the light emitting surface and the face such as the flat face or the convex curved face farthest from the light emitting surface is set to 15 degrees or less, so that an extremely high light-condensing effect can be exhibited to thereby achieve an extremely high luminance in the light source device. This difference in inclination angle between the face such as the flat face or the convex curved face closest to the light emitting surface and the face such as the flat face or the convex curved face farthest from the light emitting surface is preferably in the range of 0.5 to 10 degrees and more preferably 1 to 7 degrees. By configuring the first prism face 44 and the second prism face 45 as described above, it is possible to easily design a deflection element having a desired light condensing property and also possible to stably produce light deflection elements having constant optical properties.

Now, description will be made of shapes of prism faces of light deflection elements of the present invention. Light that is totally reflected by the prism face composed of one flat face to exit is dispersed in the considerably wide range depending on total reflection portions of the prism face. By adjusting inclination angles of the respective portions of the prism face to emit the peak lights from the respective portions in outgoing light intensity distributions (in the XZ-plane) in substantially the same direction at all the portions, it is possible to emit most of outgoing light convergently in a particular direction. In this case, by setting the inclination angles of the prism face at the respective portions such that the portion closer to the light emitting surface 42 has a larger inclination angle, the outgoing light having been totally reflected by the whole prism face can be condensed in a fixed direction so that it is possible to emit light having a higher directivity and a larger peak intensity.

As these portions of the prism face, at least two areas may be provided. However, if the number of the areas (the number of the flat faces having different inclination angles) is too small, the light condensing property of the light deflection element tends to be lowered to thereby spoil the luminance improving effect. Therefore, the number thereof is preferably set to three or more, more preferably five or more, and further preferably six or more. In this case, in order to improve the light condensing property, it is necessary that a difference between an inclination angle of the area closest to the light emitting surface 42 and an inclination angle of the area farthest from the light emitting surface 42 be set to 15 degrees or less, preferably in the range of 0.5 to 10 degrees, and more preferably in the range of 1 to 7 degrees.

On the other hand, when the number of the areas is increased, although the convergence on the whole can be enhanced because the peak angle can be finely adjusted over the whole prism face, the flat faces having different inclination angles should be finely formed so that it becomes complicated to design and produce die cutting tools for forming the prism face of the light deflection element and it also becomes difficult to stably manufacture light deflection elements having constant optical properties. In view of this, the number of the areas formed on the prism face is preferably set to 20 or less, and more preferably 12 or less. The prism face is preferably divided evenly, but is not necessarily divided evenly, which can be adjusted depending on a desired outgoing light luminance distribution (in the XZ-plane) of the whole prism face. Further, the width of each of the flat faces (length of each of flat portions in a section of the elongated prism) having different inclination angles is preferably set in the range of 4 to 47% relative to the pitch of the elongated prisms, more preferably 6 to 30%, and further preferably 7 to 20%.

Figure 3:
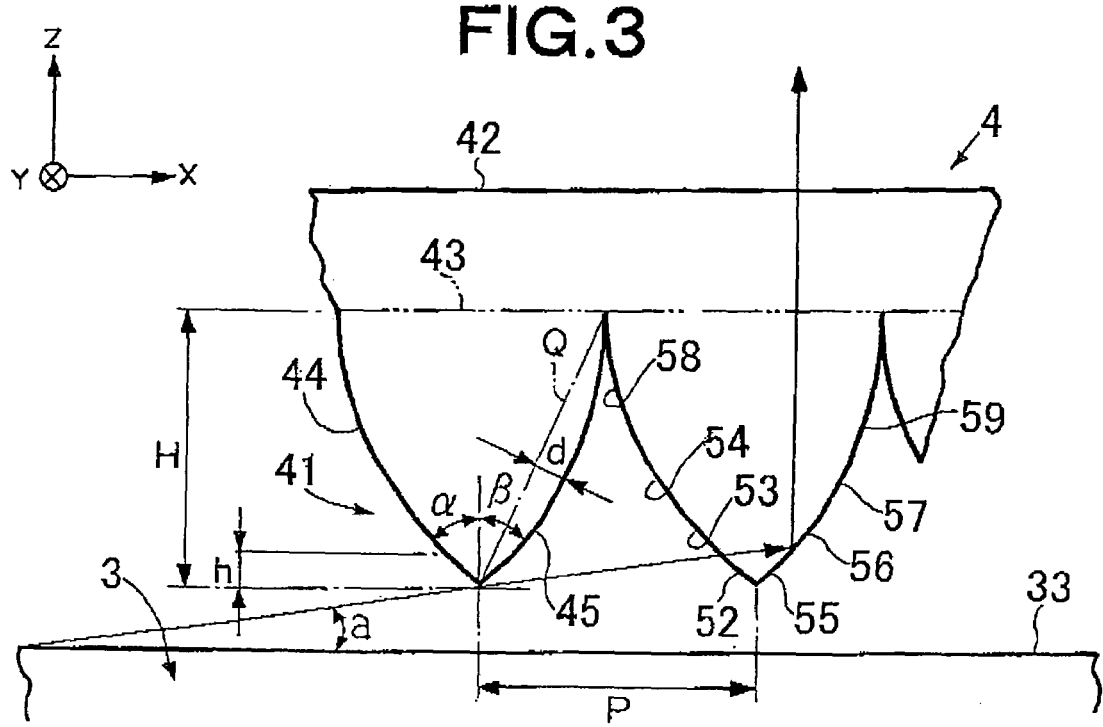
FIG. 3 is an explanatory diagram of the shape of each of elongated prisms at a light receiving surface of a light deflection element of the present invention.
Figure 4:
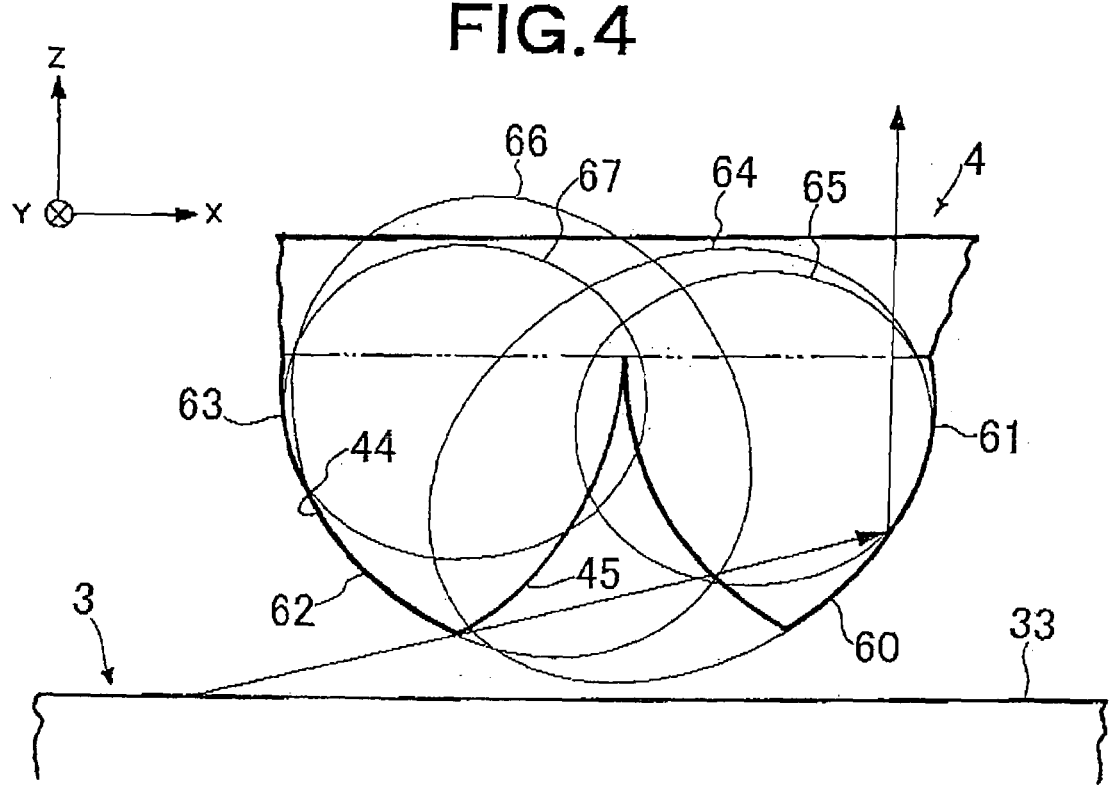
FIG. 4 is an explanatory diagram of the shape of each of elongated prisms at a light receiving surface of a light deflection element of the present invention.

In the present invention, as illustrated in, for example, FIGS. 3 and 4, at least one of the forgoing flat faces having different inclination angles may be formed as a convex curved face, or all the flat faces may be formed as convex curved faces. In FIG. 3, the first prism face 44 and the second prism face 45 are each divided into four areas and each composed of three flat faces 52 to 54 or 55 to 57 and one convex curved face 58 or 59. In FIG. 4, the first prism face 44 and the second prism face 45 are each divided into two areas and each composed of two convex curved faces 60 and 61 or 62 and 63 having different shapes. In the figure, 64 to 67 denote noncylindrical surface shapes determining the shapes of the curved faces 60 to 63, respectively on the other hand, the first prism face 44 and the second prism face 45 each may be formed by such a curved face that passes a boundary of the areas obtained by dividing the first prism face 44 or the second prism face 45, wherein the curved face may deviate from the boundary of the areas to same degree that does not cause a large reduction in luminance. For example, a deviation of a ratio of a passing position (distance from the prism vertex portion) of the curved face relative to the pitch of the elongated prisms against a ratio of the boundary of the areas thereto is preferably set to 4% or less, more preferably 2% or less, and further preferably 1% or less. In the present invention, an inclination angle of a face such as a convex curved face represents the mean of inclination angles at all positions in the face such as the convex carved face. When, as described above, the prism face is formed by a plurality of convex curved faces having different inclination angles, the number of the areas can be reduced as compared to the case where the prism face is formed by the flat faces having different inclination angles, so that the number of the areas can be set in the range of 2 to 10, preferably 2 to 5. However, if the number of the areas is too small, it becomes difficult to design respective convex curved faces in terms of adjusting a desired outgoing light luminance distribution (in the XZ-plane), and therefore, the number of the areas is more preferably set in the range of 3 to 5.

The sectional shape of the convex curved face in the XZ-direction may be circular arc (i.e. a cylindrical surface shape as a surface) or noncircular arc (i.e. a noncylindrical surface shape as a surface). Further, when the prism face is formed by a plurality of convex curved faces, it is preferable that the shapes of the respective convex curved faces differ from each other. In this case, the convex curved face having the cylindrical surface shape and the convex carved face having the noncylindrical surface shape can be used in combination. It is preferable that at least one of the convex curved faces be formed noncylindrical surface shaped. When a plurality of convex curved faces are formed cylindrical surface shaped, the respective convex curved faces may have different curvatures. As the noncylindrical surface shape, there can be cited part of an ellipsoidal shape, part of a paraboloidal shape, or the like.

Further, a ratio (r/P) between a radius of curvature (r) of the convex curved face and a pitch (P) of the elongated prisms is preferably set in the range of 2 to 50, more preferably 5 to 30, and further preferably 7 to 10. When this r/P is less than 2 or exceeds 50, there is a tendency that the sufficient light condensing property cannot be exhibited to lower the luminance.

In the elongated prism thus configured, as shown in FIG. 2, when the height from the prism vertex portion of the elongated prism is given as h and the height of the whole elongated prism is given as H, it is preferable that at least two faces such as flat faces, convex curved faces, or the like having different inclination angles be fanned in a region having the height h where h/H is at least 10% or more, and more preferably three or more be formed. This is because the sufficient light condensing property tends to be achieved by forming the two or more faces such as the flat faces, the convex curved faces, or the like in the region having such a height h. Since the intensity in an outgoing light luminance distribution (in the XZ-plane) of light that has been totally reflected by the prism face in a region with h/H being 60% or less to exit from the light emitting surface occupies 75% or more of the intensity in an outgoing light luminance distribution (in the XZ-plane) of light that has been totally reflected by the whole prism face to exit from the light emitting surface, it is possible to achieve a sufficient effect by setting h/H to fall within the range of 60% or less. This is because the intensity in the outgoing light luminance distribution (in the XZ-plane) of the light that has been totally reflected to exit from the light emitting surface occupies 75% or more of the intensity in the outgoing light luminance distribution (in the XZ-plane) of the light that has been totally reflected by the whole prism face to exit from the light emitting surface. The region having the height h is more preferably a region where h/H is 15% or more, and further preferably 20% or more. If the region having the height h becomes too small, there is a tendency that the sufficient light condensing property cannot be achieved, and further, the production of dies becomes complicated. Therefore, h/H is most preferably 20% or more. In this case, the number of the areas in the region having the height h is preferably set in the range of 1 to 8, more preferably 1 to 6, and further preferably 2 to 4.

Further, when the prism face is formed by a plurality of faces such as flat faces, convex curved faces, or the like having different inclination angles, in order to ensure the sufficient light condensing property, it is preferable that a ratio (d/P) of a maximum distance d between a virtual flat surface Q (FIGS. 2 and 3) connecting together the vertex portion and the bottom portion of the elongated prism and the plurality of flat faces or convex curved faces (actual prism face) relative to the pitch (P) of the elongated prisms be set to 0.4 to 5%. This is because when d/P is less than 0.4% or exceeds 5%, there is a tendency that the light condensing property is lowered and thus the sufficient luminance improvement cannot be achieved. Accordingly, it is more preferably set in the range of 0.4 to 3%, and further preferably 0.7 to 2.2%.

In the present invention, taking into account the light condensing property and the light utilization efficiency, the vertical angle of each elongated prism is preferably set in the range of 35 to 80 degrees, more preferably 50 to 70 degrees, and further preferably 60 to 70 degrees. Further, with respect to left and right allocated angles $\alpha$ and $\beta$ of the prism vertical angle relative to a normal (inclination angles of the two prism faces relative to the normal), the allocated angle $\alpha$ located on the light source side is preferably set in the range of 25 to 40 degrees and the allocated angle $\beta$ is preferably set in the range of 25 to 40 degrees. These allocated angles $\alpha$ and $\beta$ of the vertical angle are preferably set substantially equal to each other in order to cause peak angles in outgoing light luminance distributions (in the XZ-plane) of respective lights from the primary light sources 1 disposed at the two confronting light incident surfaces to be substantially in the same direction. Further, in order to enhance the light utilization efficiency to further improve the luminance and to minimize the reduction in luminance caused by a change in viewing direction, an absolute value of a difference ($|\alpha-\beta|$) between the allocated angles $\alpha$ and $\beta$ is preferably set in the range of 0 to 10 degrees, more preferably 0 to 9 degrees, and further preferably 0 to 8 degrees. Note that when peak light in an outgoing light luminance distribution (in the XZ-plane) is set in a direction other than the substantially normal direction, the outgoing light luminance distribution (in the XZ-plane) having the peak light in a desired direction can be achieved by adjusting the allocated angles $\alpha$ and $\beta$ of the prism vertical angle.

On the other hand, the light deflection element of the present invention may be formed with convex faces or flat faces (light transmitting regions) each having an inclination angle smaller than the inclination angle of the elongated prism, between the adjacent elongated prisms. By forming such light transmitting regions, external light incident from the side of a liquid crystal panel can be introduced into the light source device through these portions, reflected by the reflection sheet 5 disposed at the back surface of the light guide, and emitted toward the side of the liquid crystal panel again, so that the external light can also be effectively used. In this case, in order to keep uniformity of the external light reflected by the reflection sheet (light reflection element) 5, it is preferable to give a small diffusion property to the reflection sheet, form a light diffusion layer on the light emitting surface of the light deflection element, or place a light diffusion sheet on the light emitting surface of the light deflection element. On the other hand, since an increase in utilization efficiency of external light causes a reduction in utilization efficiency of light as a backlight, it is necessary to determine the ratio of each light transmitting region taking into account a manner of use and so forth. For example, the width of the light transmitting region is preferably set in the range of 20 to 50% of the pitch of the elongated prisms, and more preferably 20 to 40%. As the light transmitting region, there can be cited a region of a flat surface shape, a curved surface shape, a polygonal prism surface shape, or the like. Among them, it is preferable to form the light transmitting region into the polygonal prism surface shape or the curved surface shape because reflection of the external light can be controlled.

Figure 5:
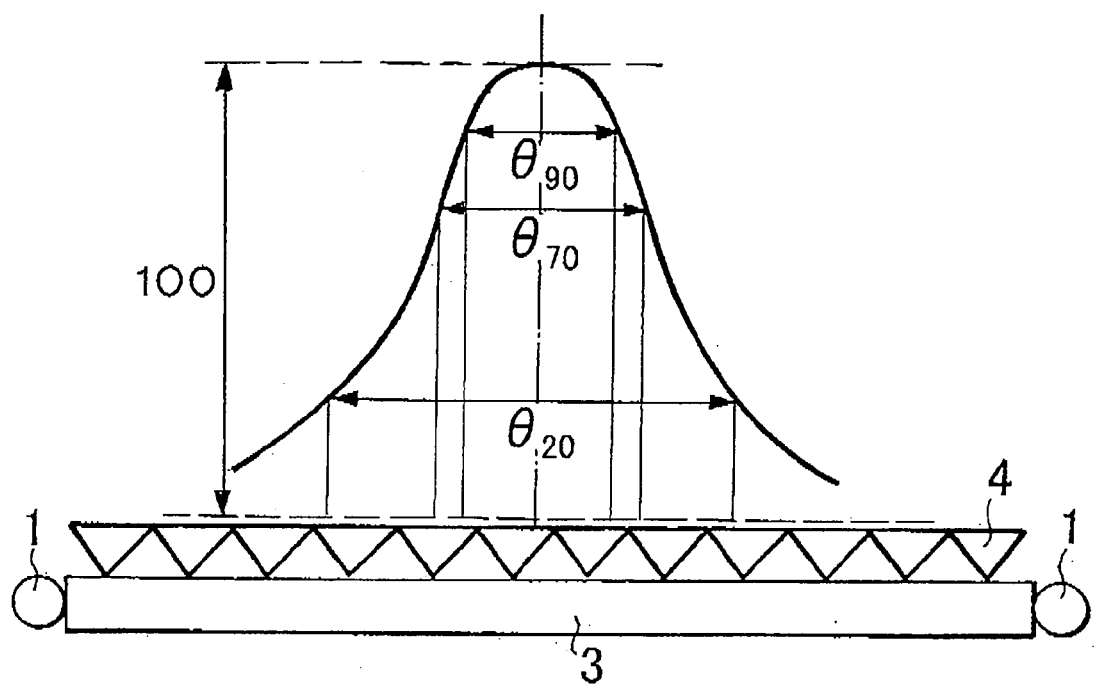
FIG. 5 is an explanatory diagram showing a light distribution (in the XZ-plane) of outgoing light from a light deflection element.

In the light source device using the light deflection element as in the present invention, if the first prism face 44 and the second prism face 45 are each formed by one curved face, an outgoing light luminance distribution (in the XZ-plane) of light exiting from the light deflection element is rapidly lowered so that a large reduction in luminance is caused by only a small change in viewing direction. In the present invention, each of the prism faces 44 and 45 is formed by a plurality of faces such as flat faces, convex curved faces, or the like having different inclination angles so that, in an outgoing light luminance distribution (in the XZ-plane) of light exiting from the light deflection element, an outgoing light distribution width ($\theta_{70}$) where a luminance becomes 70% of a peak luminance as shown in FIG. 5 can be 10 degrees or more, and therefore, it is possible to relax the rapid reduction in luminance caused by the change in viewing direction. This outgoing angle distribution width ($\theta_{70}$) is more preferably 15 degrees or more, and further preferably 18 degrees or more.

Further, in the present invention, in the outgoing light luminance distribution (in the XZ-plane) of the light exiting from the light deflection element, a ratio ($\theta_{20}/\theta_{90}$) between an outgoing light distribution width ($\theta_{90}$) where a luminance becomes 90% of the peak luminance and an outgoing light distribution width ($\theta_{20}$) where a luminance becomes 20% of the peak luminance, as shown in FIG. 5, is preferably 5 or less, more preferably 4 or less, and further preferably 3.5 or less. By setting $\theta_{20}/\theta_{90}$ to 5 or less, a rapid reduction in luminance due to a change in viewing direction can be relaxed to a degree that causes no problem for practical use.

Since the visual field narrowing of the light deflection element 4 in the present invention is affected by a degree of spread (full width half maximum) of the outgoing light intensity distribution (in the XZ-plane) of the light from the light outgoing surface 33 of the light guide 3, a preferable ratio of a full width half maximum A of the outgoing light luminance distribution (in the XZ-plane) of the light from the light emitting surface 42 of the light deflection element 4 relative to a full width half maximum B of the outgoing light intensity distribution (in the XZ-plane) of the light from the light outgoing surface 33 of the light guide 3 also changes depending on the full width half maximum B of the outgoing light intensity distribution (in the XZ-plane) of the light from the light guide 3. For example, when the full width half maximum B of the outgoing light intensity distribution (in the XZ-plane) of the light from the light guide 3 is less than 26 degrees, the full width half maximum A preferably falls within the range of 30 to 95% of the full width half maximum B, more preferably 30 to 80%, and further preferably 30 to 70%. In the other hand, when the full width half maximum B of the outgoing light intensity distribution (in the XZ-plane) of the light from the light guide 3 is 26 degrees or more, the full width half maximum A preferably falls within the range of 30 to 80% of the full width half maximum B, more preferably 30 to 70%, and further preferably 30 to 60%.

Generally, it is considered that the enhancement of the emission efficiency of the light guide increases the full width half maximum B of the outgoing light intensity distribution (in the XZ-plane) of the light from the light guide 3 so that the light condensing efficiency is lowered. However, since the effect of visual field narrowing actually increases as described above, it is preferable, in terms of the efficiency of visual field narrowing and the light utilization efficiency as the surface light source device, to use the light deflection element in combination with the light guide wherein the full width half B a of the outgoing light intensity distribution (in the XZ-plane) is 26 degrees or more (more preferably exceeding 36 degrees). On the other hand, although the effect of visual field narrowing is small when the full width half maximum of the outgoing light intensity distribution (in the XZ-plane) of the light from the light guide 3 is small, since higher luminance can be achieved as the full width half maximum of the outgoing light intensity distribution (in the XZ-plane) of the light from the light guide 3 decreases, it is preferable, in terms of achieving higher luminance, to use the light deflection element in combination with the light guide wherein the full width half maximum B of the outgoing light intensity distribution (in the XZ-plane) is less than 26 degrees.

Each of the primary light sources 1 is a linear light source extending in the Y-direction and use can be made of, for example, a fluorescent lamp or a cold-cathode tube. In the present invention, the primary light source 1 is not limited to the linear light source, but use can also be made of a point light source such as an LED light source, a halogen lamp, or a metal halide lamp. On the other hand, the light source reflector 2 serves to guide the light of the primary light source 1 to the light guide 3 with a small loss. As a material thereof, use can be made of, for example, a plastic film having a metal-deposited reflection layer on the surface. As illustrated in FIG. 1, the light source reflector 2 is wound from an outer surface of an edge portion of the light reflection element 5 via an outer periphery of the primary light source 1 to an edge portion of the light emitting surface of the light deflection element 4. On the other hand, avoiding the light deflection element 4, the light source reflector 2 can be wound from the outer surface of the edge portion of the light reflection element 5 via the outer periphery of the primary light source 1 to an edge portion of the light outgoing surface of the light guide 3.

A reflection member like such a light source reflector 2 can also be provided at a side end surface of the light guide 3 other than the side end surfaces 31. As the light reflection element 5, use can be made of, for example, a plastic sheet having a metal-deposited reflection layer on the surface. In the present invention, instead of the reflection sheet, the light reflection element 5 can be in the form of a light reflection layer formed on the back surface 34 of the light guide 3 by metal deposition or the like.

The light guide 3 and the light deflection element 4 of the present invention can be made of a synthetic resin having a high light transmissivity. Such a synthetic resin can be exemplified by a methacrylic resin, acrylic resin, polycarbonate-based resin, polyester-based resin, or polyvinyl chloride-based resin. Particularly, the methacrylic resin is excellent in light transmissivity, heat resistance, mechanical property, and moldability, and is optimum. Such a methacrylic resin is a resin containing methyl methacrylate as a main component, preferably at 80 weight/% or more. The surface structure of the roughened surface and the surface structure of the elongated prisms or the like of the light guide 3 and the light deflection element 4 may each be formed by heat-pressing a transparent synthetic resin plate using a die member having a desired surface structure, or by screen printing, extrusion molding, injection molding, or the like wherein the shape is given simultaneously with molding. Further, the structural surface can be formed by using a thermosetting or photocuring resin or the like. Further, a roughened surface structure or a lens row array structure made of an active energy line curing resin may be formed on a transparent base member such as a transparent film or sheet made of a polyester-based resin, acrylic-based resin, polycarbonate-based resin, polyvinyl chloride-based resin, polymethacrylicimide-based resin, or the like, or such a sheet may be integrally joined to a separate transparent base member by a method of bonding, fusion, or the like. As the active energy line curing resin, use can be made of multi-functional (metha) acrylic compound, vinyl compound, (metha)acrylic ester, allyl compound, metal salt of (metha) acrylic acid, or the like.

By disposing a liquid crystal display element on a light emission surface (the light emitting surface 42 of the light deflection element 4) of the surface light source device comprising the primary light sources 1, the light source reflectors 2, the light guide 3, the light deflection element 4, and the light reflection element 5, there is formed a liquid crystal display device. The liquid crystal display device is observed by a viewer from above in FIG. 1 through the liquid crystal display element. Further, in the present invention, since the fully collimated light with a narrow distribution can be incident on the liquid crystal display element from the surface light source device, an image display excellent in uniformity of brightness and hue without gradation inversion or the like can be obtained at the liquid crystal display element, and further, light irradiation converging in a desired direction can be obtained, so that it is possible to enhance the utilization efficiency of the quantity of light emitted from the primary light sources with respect to illumination of this direction.

Further, in the present invention, in order to properly control a visual field range depending on a purpose while suppressing a reduction in luminance as much as possible in the light source device that achieves narrower visual field and higher luminance by the use of the light deflection element 4 as described above, a light diffusion element 6 can be adjacently disposed on the light emitting surface of the light deflection element 4. Further, by disposing the light diffusion element 6 in this manner, it is also possible to suppress glare, luminance spots, and the like which cause deterioration in quality, to thereby achieve improvement in quality.

The light diffusion element 6 may be formed integral with the light deflection element 4 on the side of the light emitting surface thereof, or may be individually placed on the side of the light emitting surface of the light deflection element 4. Preferably, the light diffusion element 6 is individually disposed. When individually placing the light diffusion element 6, it is preferable that a surface, on the side adjacent to the light deflection element 4, of the light diffusion element 6 be given a convex-concave structure for preventing sticking with the light deflection element 4. Likewise, it is also necessary to take into account the sticking between an outgoing surface of the light diffusion element 6 and a liquid crystal display element to be disposed thereon, and it is thus preferable to give a convex-concave structure also to the outgoing surface of the light diffusion element 6. When this convex-concave structure is given only for the purpose of preventing the sticking, the average inclination angle thereof is preferably set to 0.7 degrees or more, more preferably 1 degree or gore, and further preferably 1.5 degrees or more.

Figure 7:
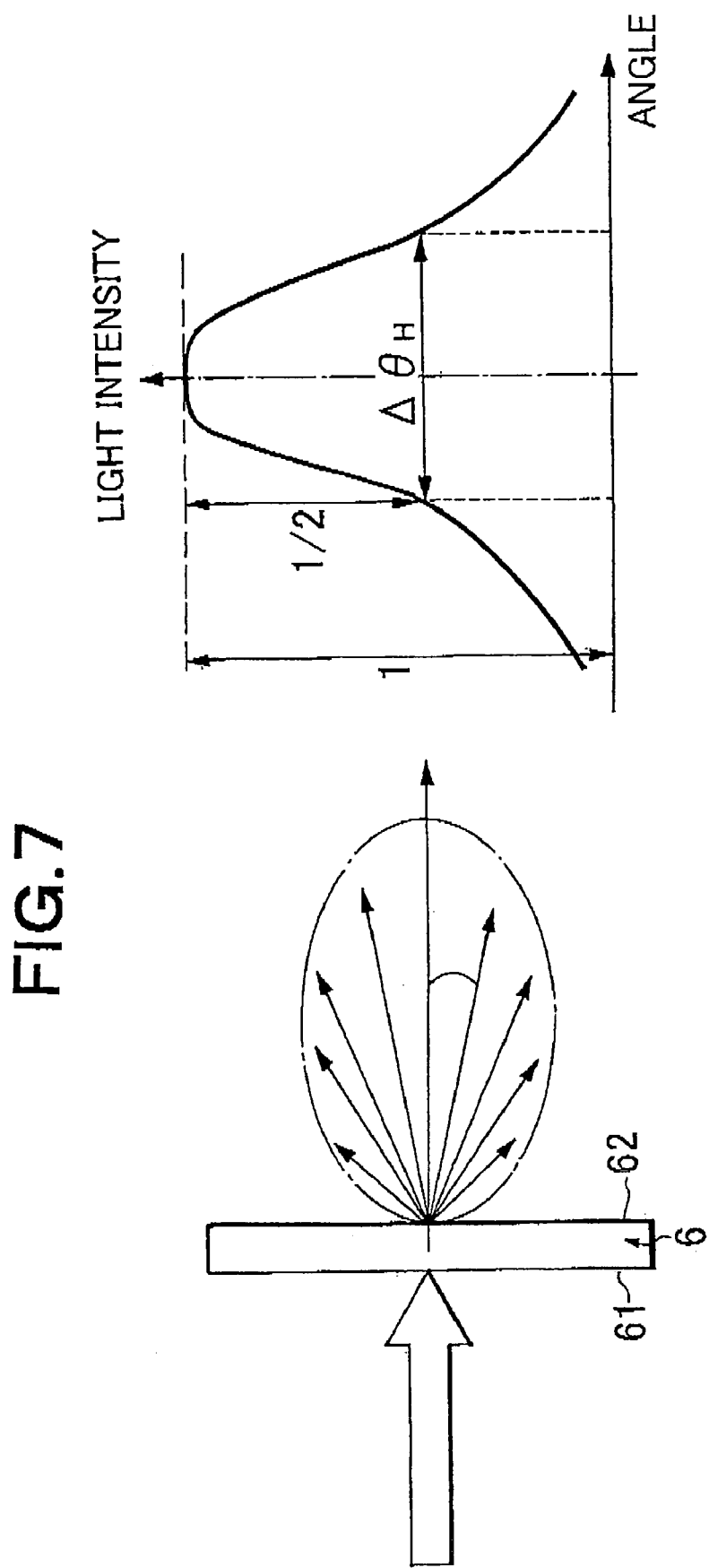
FIG. 7 is an explanatory diagram of a full width half maximum of an outgoing light intensity distribution (in the XZ-plane)

In the present invention, it is preferable that use be made of the light diffusion element 6 having a light diffusion property for properly diffusing the outgoing light from the light deflection element 4, taking into account the balance among luminance characteristic, visibility, quality, and so forth. Specifically, when the light diffusion property of the light diffusion element 6 is low, there is a tendency that it becomes difficult to sufficiently broaden the viewing angle to lower the visibility so that the quality improving effect becomes insufficient. Conversely, when the light diffusion property is too high, there is a tendency that the effect of visual field narrowing by the light deflection element 4 is spoiled and the whole light ray transmissivity is also reduced to lower the luminance. Therefore, as the light diffusion element 6 of the present invention, use is made of one that is configured such that the full width half maximum of an outgoing light intensity distribution (in the XZ-plane) falls within the range of 1 to 13 degrees when parallel light is incident thereon. The full width half maximum of the outgoing light intensity distribution of the light diffusion element 6 is preferably in the range of 3 to 11 degrees, and more preferably 4 to 8.5 degrees. In the present invention, as shown in FIG. 7, the full width half maximum of the outgoing light intensity distribution (in the XZ-plane) of the light diffusion element 6 shows to what degree parallel light rays incident on the light diffusion element 6 diffuse to spread upon exiting, and represents an angle ($\Delta\theta_H$) of the full width of a spread angle at a half value relative to a peak value in an outgoing light intensity distribution (in the XZ-plane) of light that passes through the light diffusion element 6 to diffuse.

Such a light diffusion property can be given by mixing a light diffusion agent into the light diffusion element 6 or by giving a convex-concave structure to at least one of the surfaces of the light diffusion element 6. The convex-concave structure differs in degree between a case where it is formed on one of the surfaces of the light diffusion element 6 and a case where it is formed on both surfaces thereof. When forming the convex-concave structure on one of the surfaces of the light diffusion element 6, the average inclination angle thereof is preferably set in the range of 0.8 to 12 degrees, wore preferably 3.5 to 7 degrees, and further preferably 4 to 6.5 degrees. When forming the convex-concave structure on both surfaces of the light diffusion element 6, the average inclination angle of the convex-concave structure formed on one of the surfaces is preferably set in the range of 0.8 to 6 degrees, more preferably 2 to 4 degrees, and further preferably 2.5 to 4 degrees. In this case, it is preferable that the average inclination angle on the incident surface side of the light diffusion element 6 be set greater than the average inclination angle on the outgoing surface side thereof for suppressing a reduction of the whole light ray transmissivity of the light diffusion element 6. Further, in terms of improving the luminance characteristic and visibility, a haze value of the light diffusion element 6 is preferably set in the range of 8 to 82%, more preferably 30 to 70%, and further preferably 40 to 65%.

Figure 8:
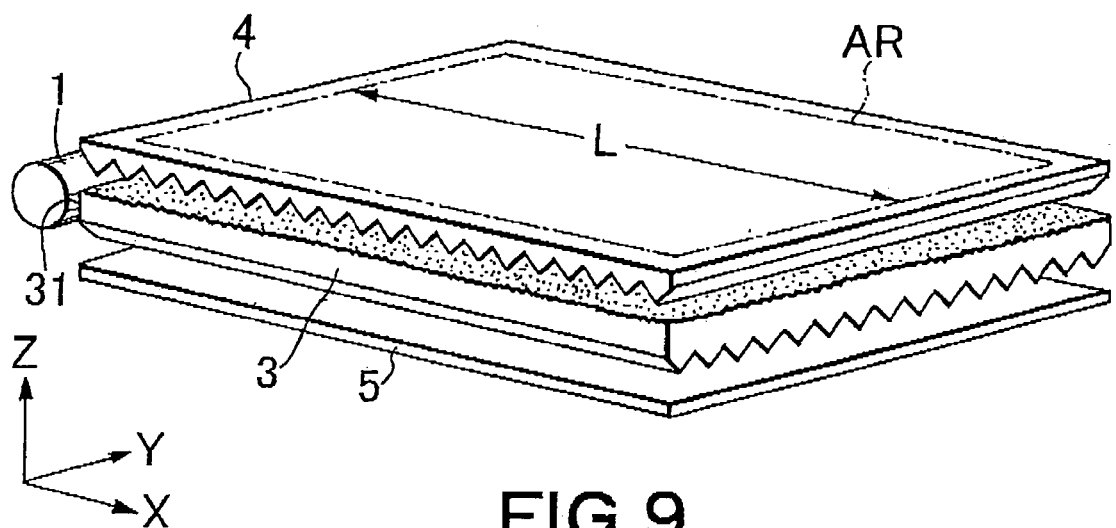
FIG. 8 is an explanatory diagram of a display area of a light source device.

In the light source device of the present invention, it is also required that the luminance in a display area as observed from a normal direction of the light emission surface (the outgoing surface of the light diffusion element 6) be uniform. This uniformity of luminance also depends on the size of a display area of a light source. For example, in a large-size light source device with a large display area of a notebook personal computer, a monitor, or the like, a relatively wide viewing angle characteristic may be required wherein an outgoing light intensity distribution (in the XZ-plane) of light exiting from a light emission surface is required to be broadened. On the other hard, in a small-size light source device with a small display area of a portable telephone, a portable information terminal, or the like, high luminance or improvement in display quality may be given priority wherein an outgoing light intensity distribution (in the XZ-plane) of light exiting from a light emission surface is allowed to be relatively narrow. Therefore, as the light diffusion element 6, use is preferably made of one having a proper light diffusion property depending on the size of a display area AR (a dimension in the X-direction perpendicular to the light incident surfaces of the light guide) of the light source device as shown in FIG. 8.

Figure 9:
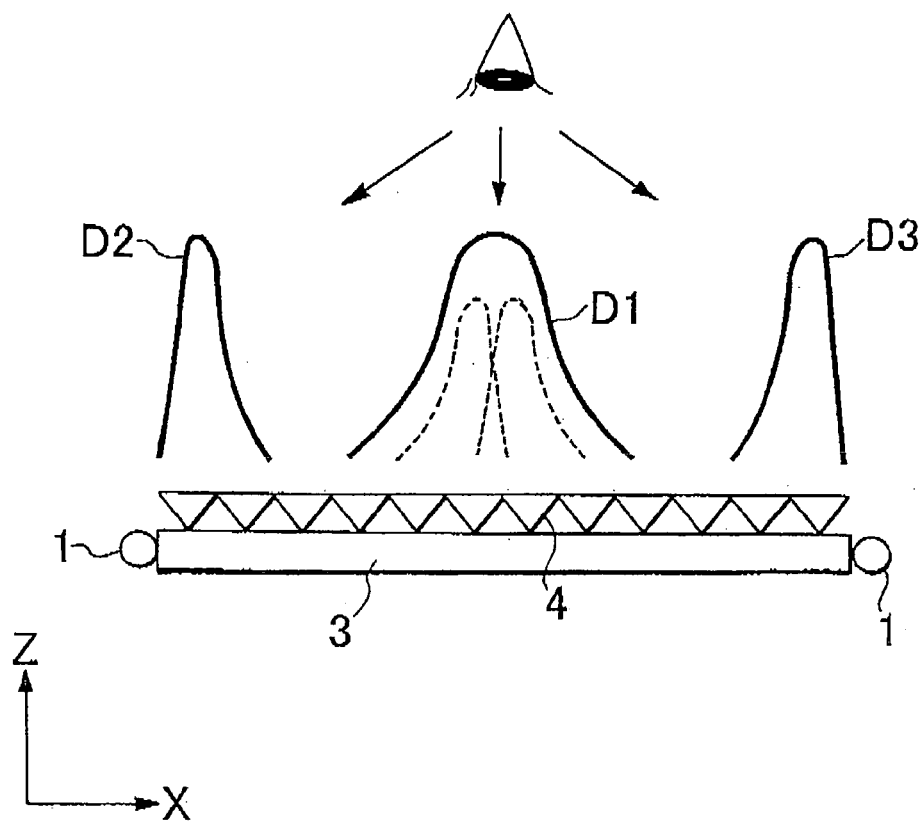
FIG. 9 is an explanatory diagram showing a luminance distribution (in the XZ-plane) of outgoing light from the light deflection element of the light source device according to the present invention.

The light source device of the present invention is suitable for a display device with a relatively large size of a monitor of a desktop personal computer, a liquid crystal television, or the like. When used in such a display device, a relatively wide viewing angle is required and further a high luminance is required. Therefore, as the primary light sources 1, use is made of the multi-lamp type wherein one or more cold-cathode tubes are disposed at each of two confronting end surfaces of the light guide 3. In this light source device, the visibility about quality differs from a light source device using a one-lamp type primary light source 1. Asymmetry of an outgoing light intensity distribution (in the XZ-plane) as described later loses its characteristic and, as shown in FIG. 9, an outgoing light intensity distribution (in the XZ-plane) in the vicinity of the center portion of the light source device is improved in symmetry even when the light diffusion element 6 is not used. Further, outgoing light intensity distributions (in the XZ-plane) in the vicinity of both ends close to the light sources are affected by lights guided from the closest places, respectively, so as to become outgoing light intensity distributions (in the XZ-plane) each being somewhat asymmetric. Specifically, in the vicinity of the left-side end portion in FIG. 9, the outgoing light intensity distribution (in the XZ-plane) on the light-source side is abruptly lowered while the outgoing light intensity distribution (in the XZ-plane) on the center side has a smooth tailing tendency, and therefore, exiting directions of light in the vicinity of the left end portion include somewhat more components directed toward the center portion. On the other hand, in the vicinity of the right-side end portion in FIG. 9, the outgoing light intensity distribution (in the XZ-plane) is opposite thereto, and therefore, exiting directions of light include somewhat more components directed toward the center portion. Consequently, it is possible to obtain an outgoing light characteristic that is excellent in visibility when observing the vicinity of both end portions from the center portion, and therefore, there is obtained a light source device that achieves a high-quality high luminance-over to the end portions. The light diffusion element 6 is required to have a light diffusion property enabling a wide viewing angle, and the full width half maximum in of the outgoing light intensity distribution (in the XZ-plane) is preferably in the range of 6 to 13 degrees, more preferably 6.5 to 11 degrees, and further preferably 7 to 9degrees. Further, the haze value is preferably in the range of 50 to 82%, more preferably 60 to 75%, and further preferably 65 to 70%. Furthermore, when the convex-concave structure is formed on the surface of the light diffusion element 6, the average inclination angle thereof is preferably in the range of 4.5 to 12 degrees, more preferably 5.5 to 8.5 degrees, and further preferably 6 to 7 degrees.

In the light source device of the present invention, when using the foregoing light diffusion element 6, there is an instance where it is preferable in terms of improvement in luminance to use the light deflection element 4 having a relatively low light condensing property such that the full width half maximum of the outgoing light luminance distribution (in the XZ-plane) of the light from the light deflection element 4 is about 19 to 26 degrees, and to use the light diffusion element 6 having a relatively low light diffusion property because this can suppress a reduction in luminance caused by diffusion in the YZ-plane. In this case, the light diffusion element 6 is required to have a light diffusion property enabling a wide viewing angle, and the full width half maximum of the outgoing light intensity distribution (in the XZ-plane) is preferably in the range of 1 to 8 degrees, more preferably 2 to 8 degrees, and further preferably 3 to 7 degrees. Further, the haze value is preferably in the range of 8 to 70%, wore preferably 30 to 65%, and further preferably 40 to 60%. Furthermore, when the convex-concave structure is formed on one of the surfaces of the light diffusion element 6, the average inclination angle thereof is preferably in the range of 0.8 to 7 degrees, more preferably 3 to 6.5 degrees, and further preferably 3.5 to 6 degrees. When the convex-concave structure is formed on both surfaces, the average inclination angle thereof on one of the surfaces is preferably in the range of 0.8 to 4 degrees, more preferably 1 to 4 degrees, and further preferably 2 to 4 degrees.

Figure 10:
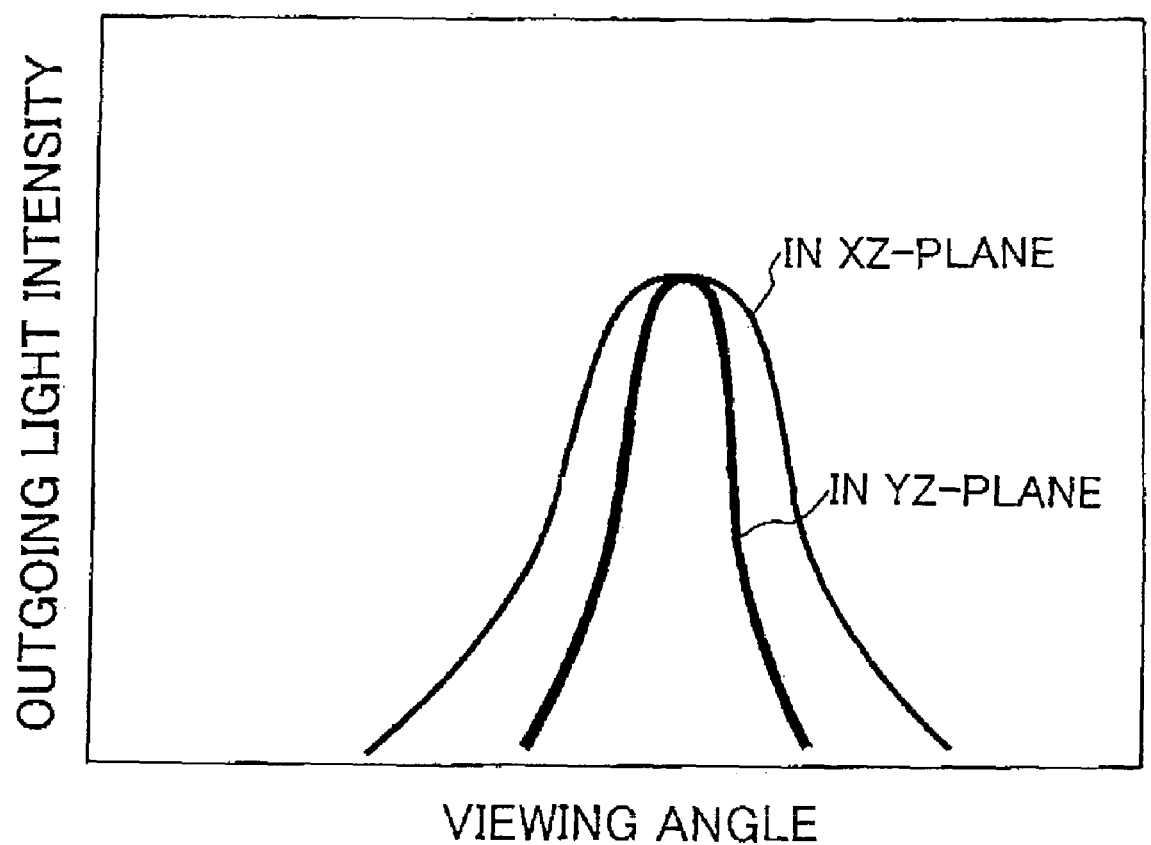
FIG. 10 is an explanatory diagram showing an outgoing light intensity distribution (in the XZ-plane) of an anisotropic diffusion property of a light diffusion element of the present invention.

In the present invention, it is preferable to use, as the light diffusion element 6, one that has an anisotropy in its light diffusion property because it can increase the whole light ray transmissivity of the light diffusion element 6, efficiently diffuse the outgoing light from the light deflection element 4, and improve the luminance. For example, in the light source device having a linear cold-cathode tube disposed as the primary light source 1 at one end surface of the light guide 3, outgoing light exiting from the light outgoing surface of the light guide 3 is subjected to visual field narrowing mainly in the XZ-plane by the light deflection element 4, and the light having been subjected to visual field narrowing in the XZ-plane is further subjected to diffusion by the light diffusion element 6 to thereby broaden the viewing angle. However, if use is made of, as the light diffusion element 6, one that has an isotropic diffusion property, the light is diffused equally even in the YZ-plane where visual field narrowing by the light deflection element is not carried out, so that a reduction in luminance is caused. Therefore, as shown in FIG. 10, by using the light diffusion element 6 having an anisotropic diffusion property that exhibits a higher light diffusion property in the XZ-plane than in the YZ-plane, diffusion of the light in the XZ-plane subjected to visual field narrowing by the light deflection element can be made strong while diffusion of the light in the YZ-plane not subjected to visual field narrowing can be made weak, so that the outgoing light from the light deflection element 4 can be efficiently diffused to thereby minimize a reduction in luminance.

Figure 11:
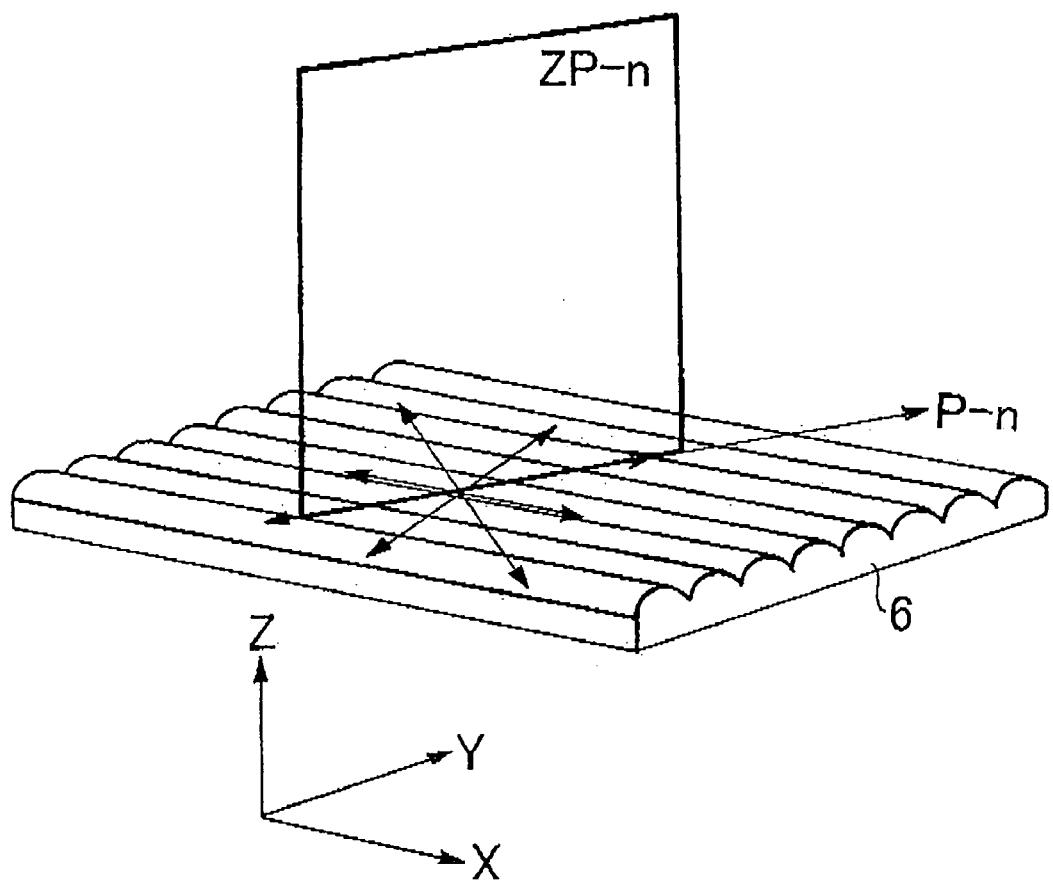
FIG. 11 is an explanatory diagram of the anisotropic diffusion property of the light diffusion element of the present invention.

With respect to the anisotropic diffusion property of the light diffusion element 6, determination on what anisotropy is required for the light diffusion element 6 is not made only based on the anisotropy in the XZ-plane and YZ-plane as described above, but it can be suitably selected depending on the shape of the light emitting function portion of the light guide 3, the lens shape and arrangement of the light deflection element 4, applied use of the light source device, and so forth. Specifically, as shown in FIG. 11, the anisotropy can be provided by assuming arbitrary planes (ZP-n planes (n=1,2, . . . )) including a normal of the outgoing surface of the light diffusion element 6 and arbitrary directions (P-n directions (n=1,2, . . . )) in the outgoing surface of the light diffusion element 6, and by causing full width half maximums of outgoing light intensity distributions (in the XZ-plane) in these arbitrary planes to differ from each other. Note that the maximum value among the full width half maximums of the ZP-n planes is given as a maximum full width half maximum, and the minimum value among them is given as a min full width half maximum. Likewise, with respect to the average inclination angle of the convex-concave structure giving the anisotropic diffusion property to the light diffusion element 6, the anisotropy of the average inclination angle can be provided by causing average inclination angles in arbitrary P-n directions where the ZP-n planes and the light diffusion element 6 (XY-plane) intersect each other, to differ from each other, in this event, the maximum value among the average inclination angles in the P-n directions is given as a maximum average inclination angle, and the maximum value among them is given as a minimum average inclination angle.

For example, when linear cold-cathode tubes are disposed respectively facing the two side end surfaces, parallel to the YZ-plane, of the light guide 3 to serve as the primary light sources 1, since the light deflection element 4 achieves visual field narrowing mainly in the XZ-plane while it hardly acts in the YZ-plane, it is optimal to use the light diffusion element 6 having an anisotropic diffusion property that effectively diffuses the outgoing light from the light deflection element 4 in the XZ-plane while does not diffuse it in the YZ-plane. Therefore, it is preferable that the light diffusion element 6 have such an anisotropic diffusion property that exhibits the maximum full width half maximum in the XZ-plane and the maximum full width half maximum in the YZ-plane. Likewise, it is preferable that the convex-concave structure formed on the light diffusion element 6 be configured or arranged to have the maximum average inclination angle in the X-direction and the maximum average inclination angle in the Y-direction.

Even in case of the light diffusion element 6 having such an anisotropic diffusion property, it is necessary that the light diffusion element 6 have a light diffusion property that suitably diffuses the outgoing light from the light deflection element 4, taking into account the balance among the luminance characteristic, visibility, quality, and so forth. Specifically, when the light diffusion property of the light diffusion element 6 is low, there is a tendency that it becomes difficult to sufficiently broaden the viewing angle to thereby lower the visibility, and the quality improving effect becomes insufficient. Conversely, when the light diffusion property is too high, there is a tendency that the effect of visual field narrowing by the light deflection element 4 is spoiled and the whole light ray transmissivity is also reduced to lower the luminance. In view of this, use is made of the light diffusion element wherein the maximum full width half maximum of the outgoing light intensity distribution (in the XZ-plane) is in the range of 1 to 13 degrees, preferably 3 to 11 degrees, and more preferably 4 to 9 degrees. Further, the ratio (full width half maximum full width half) of the maximum full width half maximum relative to the full width half maximum 15 is preferably in the range of 1.1 to 20, more preferably 2 to 15, and further preferably 4 to 10. This is because the light utilization efficiency can be improved to increase the luminance by setting maximum full width half maximum/minimum full width half maximum to 1.1 or more, while, it is possible to suppress a reduction in luminance caused by the strong light diffusion property by setting it to 20 or less.

When forming the convex-concave structure on one of the surfaces of the light diffusion element 6, the maximum average inclination angle thereof is preferably set in the range of 0.8 to 15 degrees, more preferably 3.5 to 11 degrees, and further preferably 4 to 9 degrees. Further, from the aspect like maximum full width half maximum/minimum full width half maximum, the ratio (maximum average inclination angle/minimum average inclination angle) of the maximum average inclination angle relative to the minimum average inclination angle is preferably in the range of 1.1 to 20, more preferably 2 to 15, and further preferably 4 to 10. The convex-concave structure may be formed on both surfaces of the light diffusion element 6. In this case, it is preferable that the average inclination angle on the incident surface side of the light diffusion element 6 be set greater than the average inclination angle on the outgoing surface side thereof for suppressing a reduction of the whole light ray transmissivity of the light diffusion element 6. Further, in terms of improving the luminance characteristic and visibility, the haze value of the light diffusion element 6 is preferably set in the range of 8 to 82%, more preferably 30 to 70%, and further preferably 40 to 65%.

Figure 12:
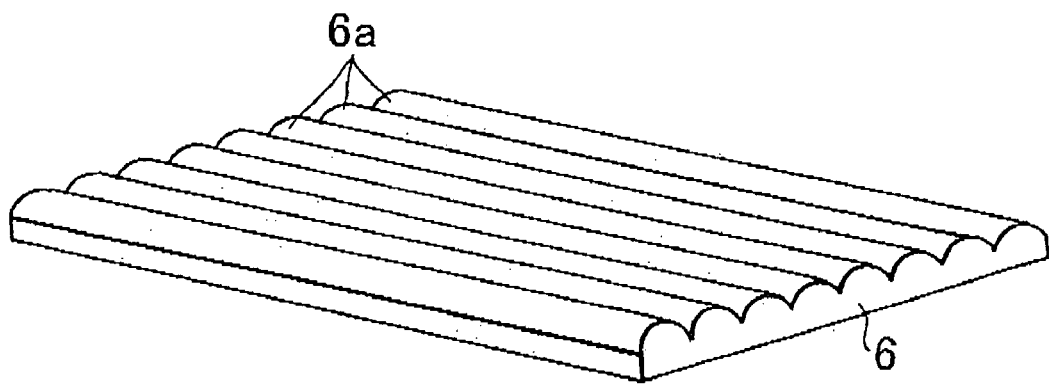
FIG. 12 is a schematic diagram showing a convex-concave structure of the light diffusion element having the anisotropic diffusion property of the present invention.
Figure 13:
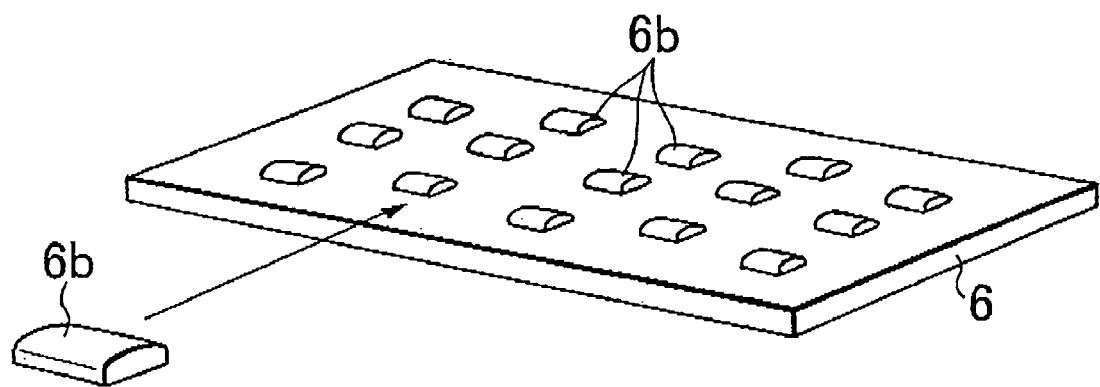
FIG. 13 is a schematic diagram showing the convex-concave structure of the light diffusion element having an anisotropic diffusion property of the present invention.
Figure 14:
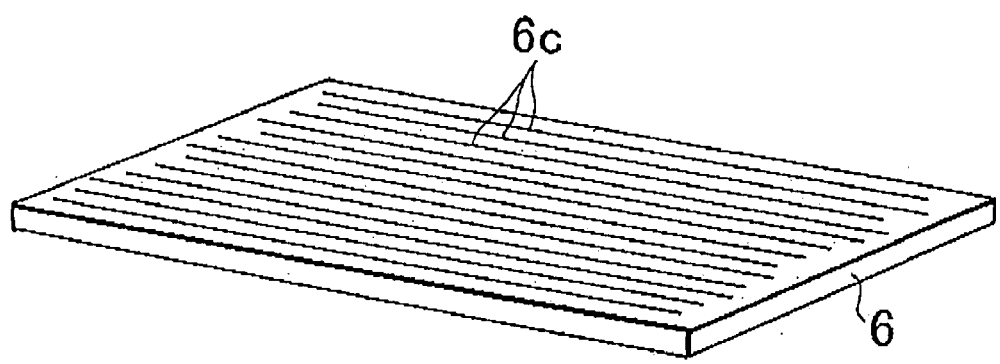
FIG. 14 is a schematic diagram showing the convex-concave structure of the light diffusion element having an anisotropic diffusion property of the present invention.

As the diffusion property giving structure of the light diffusion element 6 having the anisotropic diffusion property, there can be cited convex-concave structures as illustrated in FIGS. 12 to 14. The convex-concave structure illustrated in FIG. 12 is an array structure having a number of elongated lenses 6a such as lenticular elongated lenses successively arrayed substantially parallel to each other and each elongated along an axis. For the array pitch of the elongated lenses, it is preferable to select a pitch that is not liable to cause moire relative to the pitch of liquid crystal elements used as the display device or relative to the array pitch of the elongated lenses such as the elongated prisms of the light deflection element 4, or to use random array pitches. Normally, the array pitch of the elongated lenses is preferably set in the range of 1 to 70 μm, moire preferably 5 to 40 μm in terms of facilitating production and preventing occurrence of moire, and further preferably 10 to 30 µm. In terms of improvement in luminance and visibility, the average inclination angle in a direction perpendicular to a longitudinal direction of the lens row is preferably set in the range of 0.8 to 15 degrees, more preferably 3.5 to 11 degrees, and further preferably 4 to 9 degrees.

The convex-concave structure illustrated in FIG. 13 is a structure wherein a number of cylindrical lens shaped members 6*b* discretely arrayed. The array interval of the cylindrical lens shaped numbers say be a fixed regular pitch or random array pitches. Normally, the array pitch of the cylindrical lens shaped members is preferably set in the range of 1 to 70 µm, more preferably 5 to 40 µm in terms of facilitating production and preventing occurrence of moire, and further preferably 10 to 30 µm. In terms of improvement in luminance and visibility, the average inclination angle in a direction perpendicular to a longitudinal direction of the cylindrical lens shaped member is preferably set in the range of 0.8 to 15 degrees, more preferably 3.5 to 11 degrees, and further preferably 4 to 9 degrees. Such a discrete array structure is preferably arranged such that the probability becomes high that a line where the plane required to represent the maximum full width half maximum as the light diffusion element 6 and the outgoing surface of the light diffusion element 6 intersect each other, and the longitudinal direction of the cylindrical lens shaped member become substantially perpendicular to each other. Further, the structure is preferably arranged such that the probability becomes high that a line where the plane required to represent the minimum full width half maximum as the light diffusion element 6 and the outgoing surface of the light diffusion element 6 intersect each other, and the longitudinal direction of the cylindrical lens shaped member became substantially parallel to each other.

The convex-concave structure illustrated in FIG. 14 is a hairline structure. In terms of improvement in luminance and visibility, the average inclination angle in a direction perpendicular to an extending direction of hairlines 6*c* is preferably set in the range of 0.8 to 15 degrees, more preferably 3.5 to 11 degrees, and further preferably 4 to 9 degrees. The extending direction of the hairline is preferably a direction that is substantially perpendicular to a line where the plane required to represent the maximum full width half maximum as the light diffusion element 6 and the outgoing surface of the light diffusion element 6 intersect each other.

By applying a mat structure to at least one of the surface formed with such a convex-concave structure giving the anisotropic diffusion property and the back surface thereof, it is possible to suppress glare, luminance spots, and the like to thereby achieve improvement in quality. However, if the light diffusion property of the mat structure becomes strong, the anisotropic diffusion property may be spoiled to cause a reduction in luminance. Therefore, it is preferable to apply the rat structure having a relatively weak light diffusion property. For such a mat structure, the average inclination angle is preferably in the range of 0.5 to 5 degrees, more preferably 0.8 to 4 degrees, and further preferably 1 to 3.5 degrees. Note that when the mat structure is applied to the surface of the anisotropy giving convex-concave structure, the average inclination angle of the mat structure represents an average inclination angle of the mat structure itself excluding an average inclination angle caused by the convex-concave structure. Such an average inclination angle can be measured at a portion where the convex-concave structure does not exist, or in a direction parallel to the longitudinal direction of the convex-concave structure. It can be measured using a contact-stylus roughness meter, a method of performing an image analysis of a sectional shape of the light diffusion element 6, an atomic force microscope, or the like.

In the present invention, it is also possible to emit the outgoing light from the light guide 3 in a particular direction such as the normal direction by the use of the light deflection element 4 and emit this outgoing light in a desired direction by the use of the light diffusion element 6 having the anisotropic diffusion property. In this case, it is also possible to give both functions, i.e. an anisotropic diffusion action and a light deflection action, to the light diffusion element 6. For example, in case of using the lenticular elongated lenses or the cylindrical lens shaped members as the convex-concave structure, both functions of the anisotropic diffusion action and the light deflection action can be given by forming the sectional shape of the convex-concave structure to be asymmetric.

Further, in the present invention, for the purpose of adjusting the viewing angle as the light source device and improving the quality, a light diffusion material can be contained in the light deflection element 4 or the light diffusion element 6. As such a light diffusion material, use can be made of transparent particles having a refractive index different from that of a material forming the light deflection element 4 or the light diffusion element 6. For example, there can be cited ones made of homopolymer, copolymer, or the like of silicon beams, polystyrene, polymethylmethacrylate, fluorinated methacrylate, or the like. For the light diffusion material, it is necessary to properly select the content, particle size, refractive index, and the like so as not to spoil the visual field narrowing effect achieved by the light deflection element 4 or the proper diffusion effect achieved by the light diffusion element 6. For example, if a difference between the refractive index of the light diffusion material and that of the material forming the light deflection element 4 or the light diffusion element 6 is too small, the small diffusion effect is resulted, while, if it is too large, excessive scattering and refraction are resulted. Therefore, the refractive index difference is preferably set in the range of 0.01 to 0.1, more preferably 0.03 to 0.08, and further preferably 0.03 to 0.05. Further, when the particle size of the light diffusion material is too large, scattering becomes strong to cause glare or reduction in luminance, while, when it is too small, coloring is generated. Therefore, the average particle size is preferably set in the range of 0.5 to 20 µm, more preferably 2 to 15 µm, and further preferably 2 to 10 µm.

Hereinbelow, the present invention will be described concretely using examples.

Measurement of respective characteristic values in the following examples was implemented in the following manner.

Measurement of Normal Luminance and Light Intensity Fall Width Half of Surface Light Source Device Cold-cathode tubes were used as primary light sources, and DC12V was applied to inverters (HIU-742A produced by Harison Corporation) of drive circuits thereof to light the cold-cathode tubes at high frequency. The luminance was derived by dividing the surface of a surface light source device or a light guide into 3×5 squares each having a side of 20 mm, and averaging 15 luminance values in the normal direction of the respective squares. With respect to measurement of the light intensity full width half maximum of the light guide, a black paper having a pinhole with a diameter of 4 mm was fixed to the surface of the light guide such that the pinhole is located at the center of the surface of the light guide, the distance was adjusted so that a measurement circle of a luminance meter became 8 to 9 mm, then an adjustment was carried out so that a gonio rotation shaft was rotated about the pinhole in a perpendicular direction and a parallel direction relative to a longitudinal direction axis of the cold-cathode tube. While rotating the rotation shaft at intervals of 0.5 degrees from +80 degrees to −80 degrees in the respective directions, a light intensity distribution (in the XZ-plane) of outgoing light was measured by the luminance meter to thereby derive a luminance in the normal direction, a peak angle, a full width half maximum (a spread angle of a distribution (in the XZ-plane) of half or greater values relative to a peak value) of a light intensity distribution (in the XZ-plane), and outgoing light distribution widths ($\theta_{90}$, $\theta_{70}$, $\theta_{20}$). The peak angle took a negative value when inclined to one side with respect to the normal direction and took a positive value when inclined to the other side.

Measurement of Average Inclination Angle ($\theta a$)

Pursuant to ISO4287/1-1987, the surface roughness of a roughened surface was measured at a driving speed of 0.03 mm/sec by the use of a contact-stylus type surface roughness meter (Surfcom 570A produced by Tokyo Seiki K. K.) employing 010-2528 (1 μmR, 55° circular cone, diamond) as a stylus. From a chart obtained by this measurement, an inclination was corrected by subtracting an average line, and the average inclination angle was calculated according to the foregoing equations (1) and (2).

EXAMPLES 1 to 9

Using an acrylic resin (Acrypet VH5#000 produced by Mitsubishi Rayon Co., Ltd.), there were prepared, by injection molding, 14-inch light guides each having a size of 210 mm×300 mm with a thickness of 6 mm. Each light guide had one surface in the form of a mat having an average inclination angle of 8 degrees and the other surface having elongated prisms successively arrayed parallel to each other at a pitch of 50 μm and with a prism vertical angle of 100 degrees and each extending perpendicular to sides each having a length of 300 mm (long sides) of the light guide. Cold-cathode tubes were disposed along both side end surfaces corresponding to the sides of 300 mm (long sides) of the light guide, while the cold-cathode tubes were each covered with a light source reflector (silver reflection film produced by Reikosha) Further, light diffusion reflection films (E60 produced by Toray Industries, Inc.) were stuck to the other side end surfaces, and a reflection sheet was disposed on the elongated-prism arrayed surface (back surface). The foregoing structure was incorporated into a frame body. With respect to this light guide, the maximum peak angle of an outgoing light intensity distribution (in the XZ-plane) in the plane perpendicular to both a light incident surface and a light outgoing surface was 63 degrees relative to the normal direction of the light outgoing surface, and the full width half maximum was 44 degrees.

On the other hand, using an acrylic-based ultraviolet curing resin having a refractive index of 1.5064, there were prepared prism sheets in each of which an elongated-prism formed surface was formed on one surface of a polyester film having a thickness of 125 μm. The elongated-prism formed surface was formed with elongated prisms successively arrayed substantially parallel to each other at a pitch of 56.5 μm, wherein, as shown in Table 1, each of both prism faces (a first prism face and a second prism face) forming each elongated prism was composed of an area 1, having a height h' of the elongated prism from a prism vertex portion, in the form of a flat face (flat faces have inclination angles and allocated angles α and β of vertical angles shown in Table 1) and an area 2, i.e. a residual portion, on the side closer to a light emitting surface, in the form of a convex curved face having a radius of curvature r (convex curved faces have inclination angles shown in Table 1). In this event, ratios (r/P) each between a radius of curvature (r) of the convex curved face and the pitch (P) of the elongated prisms, and ratios (d/P) each between a maximum distance (d) between each of both prism faces and a virtual flat surface, and the pitch (P) of the elongated prisms were as shown in Table 1.

Figure 6:
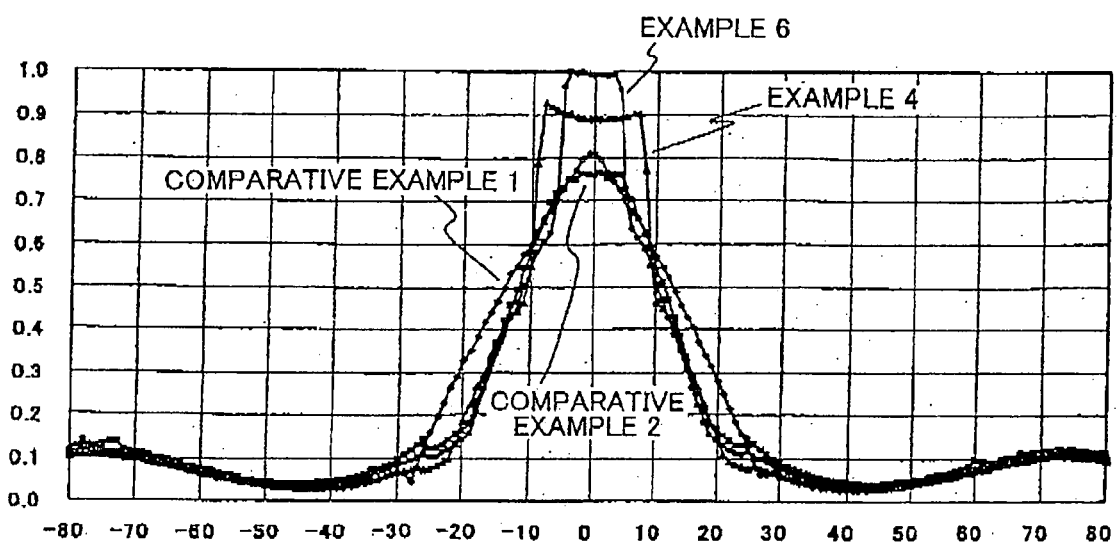
FIG. 6 is a graph showing various luminance distributions (in the XZ-plane) of outgoing lights from light deflection elements.

Each of the obtained prism sheets was placed such that the elongated-prism foamed surface was oriented toward the light outgoing surface of the foregoing light guide and the prism ridgelines were parallel to the light incident surfaces of the light guide, thereby obtaining a surface light source device. There was derived an outgoing light luminance distribution (in the XZ-plane) in the plane perpendicular to both the light incident surface and the light outgoing surface of the surface light source device. A peak luminance ratio using later-described Comparative Example 1 as a reference, a peak angle, an angle range (full width half maximum: FWMH) achieving a luminance value half a peak luminance or more, a ratio ($\theta_{20}/\theta_{90}$) between an outgoing light distribution width ($\theta_{90}$) achieving a luminance value equal to 90% of the peak luminance or more and an outgoing light distribution width ($\theta_{20}$) achieving a luminance value equal to 20% of the peak luminance or more, and an outgoing light distribution width ($\theta_{70}$) achieving a luminance equal to 70% of the peak luminance or more are shown in Table 1. With respect to Examples 4 and 6, the outgoing light luminance distributions (in the XZ-plane) are shown in FIG. 6.

COMPARATIVE EXAMPLE 1

A surface light source device was obtained like in Example 1 except that each elongated prism of a prism sheet had two prism faces each in the form of a flat face and was formed into an isosceles triangle in section (α=β=30.4 degrees) with a prism vertical angle of 60.8 degrees. There was derived an outgoing light luminance distribution (in the XZ-plane) in the plane perpendicular to both a light incident surface and a light outgoing surface of the surface light source device, and a peak luminance thereof was set to 1.00. A peak angle, an angle range (full width half maximum) achieving a luminance value half a peak luminance or more, a ratio ($\theta_{20}/\theta_{90}$) between an outgoing light distribution width ($\theta_{90}$) achieving a luminance value equal to 90% of the peak luminance or more and an outgoing light distribution width ($\theta_{20}$) achieving a luminance value equal to 20% of the peak luminance or more, and an outgoing light distribution width ($\theta_{70}$) achieving a luminance equal to 70% of the peak luminance or more are shown in Table 1. The outgoing light luminance distribution (in the XZ-plane) is shown in FIG. 6.

COMPARATIVE EXAMPLE 2

A surface light source device was obtained like in Example 1 except that each elongated prism of a prism sheet had two prism faces each in the form of a flat face and was formed into an isosceles triangle in section (α=β=32.7 degrees) with a prism vertical angle of 65.4 degrees. There was derived an outgoing light luminance distribution (in the XZ-plane) in the plane perpendicular to both a light incident surface and a light outgoing surface of the surface light source device. A peak luminance ratio using Comparative Example 1 as a reference, a peak angle, an angle range (full width half maximum) achieving a luminance value half a peak luminance or more, a ratio ($\theta_{20}/\theta_{90}$) between an outgoing light distribution width ($\theta_{90}$) achieving a luminance value equal to 90% of the peak luminance or more and an outgoing light distribution width ($\theta_{20}$) achieving a luminance value equal to 20% of the peak luminance or more, and an outgoing light distribution width ($\theta_{70}$) achieving a luminance equal to 70% of the peak luminance or more are shown in Table 1. The outgoing light luminance distribution (in the XZ-plane) is shown in FIG. 6.

EXAMPLE 10

A prism sheet was prepared like in Example 1 except that, as shown in Table 2, each of both prism faces forming each elongated prism was formed by two flat faces (areas 1 and 2 from the side of the prism vertex portion), i.e. a flat face ($\beta$=32.0 degrees) formed from the prism vertex portion to a height 17.1 μm (h') of the elongated prism and having an inclination angle of 58.0 degrees, and a flat face formed from and above the height 17.1 μm of the elongated prism and having an inclination angle of 62.0 degrees.

The obtained prism sheet was placed such that the elongated-prism formed surface was oriented toward the light outgoing surface of the same light guide as in Example 1 and the prism ridgelines were parallel to the light incident surfaces of the light guide, thereby obtaining a surface light source device. There was derived an outgoing light luminance distribution (in the XZ-plane) in the plane perpendicular to both the light incident surface and the light outgoing surface of the surface light source device. A peak luminance ratio using Comparative Example 1 as a reference, a peak angle, an angle range (full width half maximum) achieving a luminance value half a peak luminance or more, a ratio ($\theta_{20}/\theta_{90}$) between an outgoing light distribution width ($\theta_{90}$) achieving a luminance value equal to 90% of the peak luminance or more and an outgoing light distribution width ($\theta_{20}$) achieving a luminance value equal to 20% of the peak luminance or more, and an outgoing light distribution width ($\theta_{70}$) achieving a luminance equal to 70% of the peak luminance or more are shown in Table 2. In this event, a ratio (d/P) of a maximum distance (d) between each of both prism faces and a virtual flat surface relative to the pitch (P) of the elongated prisms was as shown in Table 2.

EXAMPLE 11

A prism sheet was prepared like in Example 1 except that, as shown in Table 2, each of both prism faces forming each elongated prism was formed by two flat faces (areas 1 and 2 from the side of the prism vertex portion), i.e. a flat face ($\beta$=32.0 degrees) formed from the prism vertex portion to a height 17.1 μm (h') of the elongated prism and having an inclination angle of 58.0 degrees, and a flat face formed from and above the height 17.1 μm of the elongated prism and having an inclination angle of 60.0 degrees.

The obtained prism sheet was placed such that the elongated-prism formed surface was oriented toward the light outgoing surface of the same light guide as in Example 1 and the prism ridgelines were parallel to the light incident surfaces of the light guide, thereby obtaining a surface light source device. There was derived an outgoing light luminance distribution (in the XZ-plane) in the plane perpendicular to both the light incident surface and the light outgoing surface of the surface light source device. A peak luminance ratio using Comparative Example 1 as a reference, a peak angle, an angle range (full width half maximum) achieving a luminance value half a peak luminance or more, a ratio ($\theta_{20}/\theta_{90}$) between an outgoing light distribution width ($\theta_{90}$) achieving a luminance value equal to 90% of the peak luminance or more and an outgoing light distribution width ($\theta_{20}$) achieving a luminance value equal to 20% of the peak luminance or more, and an outgoing light distribution width ($\theta_{70}$) achieving a luminance equal to 70% of the peak luminance or more are shown in Table 2. In this event, a ratio (d/P) of a maximum distance (d) between each of both prism faces and a virtual flat surface relative to the pitch (P) of the elongated prisms was as shown in Table 2.

EXAMPLE 12

A prism sheet was prepared like in Example 1 except that, as shown in Table 2, each of both prism faces forming each elongated prism was formed by three flat faces (areas 1, 2, and 3 from the side of the prism vertex portion), i.e. a flat face ($\beta$=32.7 degrees) formed from the prism vertex portion to a height 17.4 μm (h') of the elongated prism and having an inclination angle of 57.3 degrees, a flat face formed from the height 17.4 μm to a height 31.0 μm of the elongated prism and having an inclination angle of 58.0 degrees, and

TABLE 1

| | Prism Vertical Angle (°) | | Inclination Angle of Flat or Convex-curved face(°) | | | h' | h'/H | Radius of Curvature of Convex-curved Face, | d/P | Peak Luminance | Peak Angle | FWHM | | $\theta_{70}$ |
|---|---|---|---|---|---|---|---|---|---|---|---|---|---|---|
| | α | β | Area 1 | | Area 2 | (μm) | (%) | (μm) | r/P | (%) Ratio | (°) | (°) | $\theta_{20}/\theta_{90}$ | (°) |
| Example 1 | 32.0 | 32.0 | Flat | 58.0 | Convex 62.0 | 17.1 | 34.1 | 452 | 8.00 | 1.79 | 1.05 | 11 | 29.7 | 1.53 | 26.7 |
| Example 2 | 32.0 | 32.0 | Flat | 58.0 | Convex 60.0 | 21.1 | 44.6 | 452 | 8.00 | 1.01 | 1.15 | 6 | 24.4 | 2.93 | 14.8 |
| Example 3 | 32.0 | 32.0 | Flat | 58.0 | Convex 60.0 | 17.1 | 36.0 | 452 | 8.00 | 1.13 | 1.14 | 7 | 24.3 | 2.62 | 16.4 |
| Example 4 | 32.0 | 32.0 | Flat | 58.0 | Convex 60.0 | 13.4 | 28.0 | 452 | 8.00 | 0.94 | 1.13 | 8 | 23.3 | 2.41 | 18.1 |
| Example 5 | 34.0 | 34.0 | Flat | 56.0 | Convex 62.0 | 22.1 | 47.0 | 452 | 8.00 | 2.55 | 1.18 | 1 | 24.2 | 3.76 | 21.4 |
| Example 6 | 32.7 | 32.7 | Flat | 57.3 | Convex 59.0 | 17.4 | 38.0 | 452 | 8.00 | 0.99 | 1.23 | 4 | 21.4 | 3.80 | 11.0 |
| Example 7 | 34.0 | 34.0 | Flat | 56.0 | Convex 62.0 | 17.9 | 37.1 | 452 | 8.00 | 2.46 | 1.13 | 3 | 26.4 | 2.40 | 24.4 |
| Example 8 | 34.0 | 34.0 | Flat | 56.0 | Convex 58.0 | 17.9 | 41.0 | 452 | 8.00 | 0.98 | 1.36 | 0 | 17.3 | 8.50 | 6.7 |
| Example 9 | 36.0 | 36.0 | Flat | 54.0 | Convex 60.0 | 18.9 | 43.0 | 452 | 8.00 | 2.40 | 1.06 | 0 | 18.4 | 4.07 | 14.6 |
| Com. Ex. 1 | 30.4 | 30.4 | | 59.6 | | — | — | — | — | — | 1.00 | 0 | 33.6 | 5.44 | 21.3 |
| Com. Ex 2 | 32.7 | 32.7 | | 57.3 | | — | — | — | — | — | 0.94 | 1 | 28.9 | 3.07 | 21.5 | a flat face formed from and above the height 31.0 μm of the elongated prism and having an inclination angle of 60.0 degrees.

The obtained prism sheet was placed such that the elongated-prism formed surface was oriented toward the light outgoing surface of the same light guide as in Example 1 and the prism ridgelines were parallel to the light incident surfaces of the light guide, thereby obtaining a surface light source device. There was derived an outgoing light luminance distribution (in the XZ-plane) in the plane perpendicular to both the light incident surface and the light outgoing surface of the surface light source device. A peak luminance ratio using Comparative Example 1 as a reference, a peak angle, an angle range (full width half maximum) achieving a luminance value half a peak luminance or more, a ratio ($\theta_{20}/\theta_{90}$) between an outgoing light distribution width ($\theta_{90}$) achieving a luminance value equal to 90% of the peak luminance or more and an outgoing light distribution width ($\theta_{20}$) achieving a luminance value equal to 20% of the peak luminance or more, and an outgoing light distribution width ($\theta_{70}$) achieving a luminance equal to 70% of the peak luminance or more are shown in Table 2. In this event, a ratio (d/P) of a maximum distance (d) between each of both prism faces and a virtual flat surface relative to the pitch (P) of the elongated prisms was as shown in Table 2.

EXAMPLE 13

A prism sheet was prepared like in Example 1 except that, as shown in Table 2, each of both prism faces forming each elongated prism was formed by three flat faces (areas 1, 2, and 3 from, the side of the prism vertex portion), i.e. a flat face (β30.0 degrees) formed from the prism vertex portion to a height 16.4 μm (h') of the elongated prism and having an inclination angle of 60.0 degrees, a flat face formed from the height 16.4 μm to a height 33.0 μm of the elongated prism and having an inclination angle of 60.5 degrees, and a flat face formed from and above the height 33.0 μm of the elongated prism and having an inclination angle of 63.4 degrees.

The obtained prism sheet was placed such that the elongated-prism formed surface was oriented toward the light outgoing surface of the same light guide as in Example 1 and the prism ridgelines were parallel to the light incident surfaces of the light guide, thereby obtaining a surface light source device. There was derived an outgoing light luminance distribution (in the XZ-plane) in the plane perpendicular to both the light incident surface and the light outgoing surface of the surface light source device. A peak luminance ratio using Comparative Example 1 as a reference, a peak angle, an angle range (full width half maximum) achieving a luminance value half a peak luminance or more, a ratio ($\theta_{20}/\theta_{50}$) between an outgoing light distribution width ($\theta_{50}$) achieving a luminance value equal to 90% of the peak luminance or more and an outgoing light distribution width ($\theta_{20}$) achieving a luminance value equal to 20% of the peak luminance or more, and an outgoing light distribution width ($\theta_{70}$) achieving a luminance equal to 70% of the peak luminance or more are shown in Table 2. In this event, a ratio (d/P) of a maximum distance (d) between each of both prism faces and a virtual flat surface relative to the pitch (P) of the elongated prisms was as shown in Table 2.

EXAMPLE 14

A prism sheet was prepared like in Example 1 except that, as shown in Table 2, each of both prism faces forming each elongated prism was formed by two flat faces and one convex curved face (areas 1, 2, and 3 from the side of the prism vertex portion), i.e. a flat face (β=32.9 degrees) formed from the prism vertex portion to a height 10.2 μm (h') of the elongated prism and having an inclination angle of 57.1 degrees, a flat face formed from the height 10.2 μm to a height 21.0 μm of the elongated prism and having an inclination angle of 58.9 degrees, and a convex curved face (inclination angle=60.0 degrees, an angle formed between a chord of a convex curved surface portion and a normal of the elongated-prism formed surface=31.1 degrees) having a cylindrical surface shape with a radius of curvature of 400 μm and formed from and above the height 21.0 μm of the elongated prism.

The obtained prism sheet was placed such that the elongated-prism formed surface was oriented toward the light outgoing surface of the same light guide as in Example 1 and the prism ridgelines were parallel to the light incident surfaces of the light guide, thereby obtaining a surface light source device. There was derived an outgoing light luminance distribution (in the XZ-plane) in the plane perpendicular to both the light incident surface and the light outgoing surface of the surface light source device. A peak luminance ratio using Comparative Example 1 as a reference, a peak angle, an angle range (full width half maximum) achieving a luminance value half a peak luminance or more, a ratio ($\theta_{20}/\theta_{90}$) between an outgoing light distribution width ($\theta_{90}$) achieving a luminance value equal to 90% of the peak luminance or more and an outgoing light distribution width ($\theta_{20}$) achieving a luminance value equal to 20% of the peak luminance or more, and an outgoing light distribution width ($\theta_{70}$) achieving a luminance equal to 70% of the peak luminance or more are shown in Table 2. In this event, a ratio (d/P) of a maximum distance (d) between each of both prism faces and a virtual flat surface relative to the pitch (P) of the elongated prisms was as shown in Table 2.

EXAMPLE 15

A prism sheet was prepared like in Example 1 except that, as shown in Table 2, each of both prism faces forming each elongated prism was famed by two convex curved faces (areas 1 and 2 from the side of the prism vertex portion), i.e. a convex curved face (inclination angle=56.6 degrees, β=33.7 degrees) having an ellipsoidal shape in section (near a point of intersection with a minor axis of an oval shape having a radius of curvature of 400 μm at a point of intersection with a major axis and a radius of curvature of 800 μm at a point of intersection with the minor axis) and formed from the prism vertex portion to a height 10.7 μm (h') of the elongated prism, and a convex curved face (inclination angle=64.0 degrees, an angle formed between a chord of a convex curved surface portion and a normal of the elongated-prism formed surface=26.0 degrees) having a cylindrical surface shape with a radius of curvature of 400 μm and formed from and above the height 10.7 μm of the elongated prism.

The obtained prism sheet was placed such that the elongated-prism formed surface was oriented toward the light outgoing surface of the same light guide as in Example 1 and the prism ridgelines were parallel to the light incident surfaces of the light guide, thereby obtaining a surface light source device. There was derived an outgoing light luminance distribution (in the XZ-plane) in the plane perpendicular to both the light incident surface and the light outgoing surface of the surface light source device. A peak luminance ratio using Comparative Example 1 as a reference, a peak angle, an angle range (full width half maximum) achieving a luminance value half a peak luminance or more, a ratio ($\theta_{20}/\theta_{90}$) between an outgoing light distribution width ($\theta_{90}$) achieving a luminance value equal to 90% of the peak luminance or more and an outgoing light distribution width ($\theta_{20}$) achieving a luminance value equal to 20% of the peak luminance or more, and an outgoing light distribution width ($\theta_{70}$) achieving a luminance equal to 70% of the peak luminance or wore are shown in Table 2. In this event, a ratio (d/P) of a maximum distance (d) between each of both prism faces and a virtual flat surface relative to the pitch (P) of the elongated prisms was as shown in Table 2.

TABLE 2

| | Prism Vertical Angle (°) | | Inclination Angle of Flat or Convex-curved face(°) | | | | | | h' | h'/H | d/P | Peak Luminance | Peak Angle | FWHM | | $\theta_{70}$ |
|---|---|---|---|---|---|---|---|---|---|---|---|---|---|---|---|---|
| | α | β | Area 1 | | Area 2 | | Area 3 | | (μm) | (%) | (%) | Ratio | (°) | (°) | $\theta_{20}/\theta_{90}$ | (°) |
| Example 10 | 32.0 | 32.0 | Flat | 58.0 | Flat | 62.0 | — | — | 17.1 | 34.1 | 1.62 | 0.99 | 6 | 33.3 | 1.97 | 26.4 |
| Example 11 | 32.0 | 32.0 | Flat | 58.0 | Flat | 60.0 | — | — | 17.1 | 36.0 | 2.09 | 1.10 | 1 | 28.1 | 1.29 | 21.0 |
| Example 12 | 32.7 | 32.7 | Flat | 57.3 | Flat | 58.0 | Flat | 60.0 | 17.4 | 37.9 | 0.95 | 1.22 | 2 | 21.6 | 4.82 | 14.7 |
| Example 13 | 30.0 | 30.0 | Flat | 60.0 | Flat | 60.5 | Flat | 63.4 | 16.4 | 31.7 | 1.30 | 0.92 | 9 | 36.3 | 2.32 | 29.9 |
| Example 14 | 32.9 | 32.9 | Flat | 57.1 | Flat | 58.9 | Convex | 60.0 | 10.2 | 21.5 | 1.01 | 1.15 | 6 | 26.5 | 2.53 | 15.6 |
| Example 15 | 33.7 | 33.7 | Convex | 56.6 | Convex | 64.0 | — | — | 10.7 | 19.7 | 3.88 | 0.95 | 11 | 33.1 | 2.19 | 27.4 |

INDUSTRIAL APPLICABILITY

As described above, it is possible to provide a light source device that can achieve improvement in luminance by a high light-condensing effect, that is small in reduction of luminance with respect to a change in viewing direction, that enables improvement in utilization efficiency of the quantity of light emitted from a primary light source (i.e. increases efficiency of emitting light, emitted from a primary light source, concentratedly in a required viewing direction), and further, that can easily improve the image quality with a simplified structure.

The invention claimed is:

1. A light source device comprising primary light sources, a light guide having two light incident surfaces opposed to each other and adapted to receive light emitted from said primary light sources, and a light outgoing surface for guiding and emitting the received light, and a light deflection element disposed adjacent to said light guide on a light outgoing surface side thereof,
wherein said light deflection element has a light receiving surface for receiving the light and a light emitting surface located on a side opposite to said light receiving surface for emitting the received light, said light receiving surface has a plurality of elongated prisms arrayed substantially parallel to each other and each composed of two prism faces, and each of said prism faces is formed by at least two faces having different inclination angles wherein one of said faces located closer to said light emitting surface has a larger inclination angle and a difference between an inclination angle of one of said faces closest to said light emitting surface and an inclination angle of the other one of said faces farthest from said light emitting surface is 15 degrees or less.

2. A light source device according to claim 1, wherein at least one of said faces is a flat face.

3. A light source device according to claim 2, wherein all of said faces are flat faces.

4. A light source device according to claim 3, wherein said faces are at least three flat faces.

5. A light source device according to claim 1, wherein at least one of said faces is a convex curved face.

6. A light source device according to claim 5, wherein all of said faces are convex curved faces.

7. A light source device according to claim 5, wherein said faces are at least one flat face and at least one convex curved face.

8. A light source device according to claim 7, wherein said faces are at least two flat faces and at least one convex curved face.

9. A light source device according to claim 5, wherein at least two of said faces are convex curved faces having mutually different shapes.

10. A light source device according to claim 5, wherein a ratio (r/P) between a radius of curvature (r) of said convex curved face and a pitch (P) of said elongated prisms is 2 to 50.

11. A light source device according to claim 5, wherein at least one of said convex curved faces is a noncylindrical surface.

12. A light source device according to claim 1, wherein the number of said faces formed in a region having a height h from a vertex portion of said elongated prism is at least two and, when a height of said elongated prism is given as H, h/H is 10% or more.

13. A light source device according to claim 1, wherein a ratio (d/P) of a maximum distance (d) between said faces and a virtual flat surface which is defined by connecting a vertex portion and a bottom portion of said elongated prism to each other relative to a pitch (P) of said elongated prisms is 0.4 to 5%.

14. A light source device according to claim 1, wherein a vertical angle of said elongated prism is 35 to 80 degrees.

15. A light source device according to claim 1, wherein one (α) of allocated angles of a vertical angle of said elongated prism is 25 to 40 degrees, and the other allocated angle (β) is 25 to 40 degrees.

16. A light source device according to claim 1, wherein one (α) of allocated angles of a vertical angle of said elongated prism and the other allocated angle (β) differ from each other.

17. A light source device according to claim 1, wherein, in a luminance distribution of outgoing light emitted from said light deflection element, an outgoing light distribution width ($\theta_{70}$) where a luminance becomes 70% of a peak luminance is 10 degrees or more.

18. A light source device according to claim 1, wherein, in a luminance distribution of outgoing light emitted from said light deflection element, a ratio ($\theta_{20}/\theta_{90}$) between an outgoing light distribution width ($\theta_{90}$) where a luminance becomes 90% of a peak luminance and an outgoing light distribution width ($\theta_{20}$) where a luminance becomes 20% of the peak luminance is 5 or less.

19. A light source device according to claim 1, wherein a light diffusion element is adjacently disposed on the light emitting surface of said light deflection element.

20. A light source device according to claim 19, wherein said light diffusion element is configured such that a full width half maximum of an outgoing light intensity distribution is 1 to 13 degrees when parallel light is incident thereon.

21. A light source device according to claim 19, wherein a haze value of said light diffusion element is 8 to 82%.

22. A light source device according to claim 19, wherein an average inclination angle of at least one of surfaces of said light diffusion element is 0.8 to 12 degrees.

23. A light source device according to claim 19, wherein said light diffusion element is configured such that a full width half maximum of an outgoing light intensity distribution has an anisotropy when parallel light is incident thereon.

24. A light source device according to claim 19, wherein said light diffusion element is configured such that a maximum full width half maximum of an outgoing light intensity distribution is 1.1 times a minimum full width half maximum or greater when parallel light is incident thereon.

25. A light deflection element comprising a light receiving surface for receiving light and a light emitting surface located on a side opposite to said light receiving surface for emitting the received light,
wherein said light receiving surface has a plurality of elongated prisms arrayed substantially parallel to each other and each composed of two prism faces; and each of said prism faces is formed by at least two faces having different inclination angles wherein one of said faces located closer to said light emitting surface has a larger inclination angle and a difference between an inclination angle of one of said faces closest to said light emitting surface and an inclination angle of the other one of said faces farthest from said light emitting surface is 15 degrees or less.

26. A light deflection element according to claim 25, wherein at least one of said faces is a flat face.

27. A light deflection element according to claim 26, wherein all of said faces are flat faces.

28. A light deflection element according to claim 27, wherein said faces are at least three flat faces.

29. A light deflection element according to claim 25, wherein at least one of said faces is a convex curved face.

30. A light deflection element according to claim 29, wherein all of said faces are convex curved faces.

31. A light deflection element according to claim 29, wherein said faces are at least one flat face and at least one convex curved face.

32. A light deflection element according to claim 31, wherein said faces are at least two flat faces and at least one convex curved face.

33. A light deflection element according to claim 29, wherein at least two of said faces are convex curved faces having mutually different shapes.

34. A light deflection element according to claim 29, wherein a ratio (r/P) between a radius of curvature (r) of said convex curved face and a pitch (P) of said elongated prisms is 2 to 50.

35. A light deflection element according to claim 29, wherein at least one of said convex curved faces is a noncylindrical surface.

36. A light deflection element according to claim 25, wherein the number of said faces formed in a region having a height h from a vertex portion of said elongated prism is at least two and, when a height of said elongated prism is given as H, h/H is 10% or more.

37. A light deflection element according to claim 25, wherein a ratio (d/P) of a maximum distance (d) between said faces and a virtual flat surface which is defined by connecting a vertex portion and a bottom portion of said elongated prism to each other relative to a pitch (P) of said elongated prisms is 0.4 to 5%.

38. A light deflection element according to claim 25, wherein a vertical angle of said elongated prism is 35 to 80 degrees.

39. A light deflection element according to claim 25, wherein one ($\alpha$) of allocated angles of a vertical angle of said elongated prism is 25 to 40 degrees, and the other allocated angle ($\beta$) is 25 to 40 degrees.

40. A light deflection element according to claim 25, wherein one ($\alpha$) of allocated angles of a vertical angle of said elongated prism and the other allocated angle ($\beta$) differ from each other.

* * * * *